(12) United States Patent
Swarup et al.

(10) Patent No.: US 6,762,240 B2
(45) Date of Patent: Jul. 13, 2004

(54) HIGHLY CROSSLINKED POLYMER PARTICLES AND COATING COMPOSITIONS CONTAINING THE SAME

(75) Inventors: Shanti Swarup, Allison Park, PA (US); Brian Endlich, Apollo, PA (US); M. Frank Haley, Glenshaw, PA (US); Charles M. Kania, Natrona Heights, PA (US); Kurt G. Olson, Gibsonia, PA (US); Edward S. Pagac, Portersville, PA (US); Kaliappa G. Ragunathan, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 76 days.

(21) Appl. No.: 10/126,137

(22) Filed: Apr. 19, 2002

(65) Prior Publication Data

US 2003/0204013 A1 Oct. 30, 2003

(51) Int. Cl.$^7$ .............................................. C08F 216/04
(52) U.S. Cl. ....................... 524/560; 524/559; 524/555; 524/556; 524/562; 524/577
(58) Field of Search ................ 524/560, 589, 524/555, 556, 562, 577, 559

(56) References Cited

U.S. PATENT DOCUMENTS

| | | | |
|---|---|---|---|
| 3,479,328 A | 11/1969 | Nordstrom | 526/312 |
| 3,799,854 A | 3/1974 | Jerabek | 428/425.8 |
| 4,001,156 A | 1/1977 | Bosso et al. | 523/421 |
| 4,046,729 A | 9/1977 | Scriven et al. | 524/589 |
| 4,147,679 A | 4/1979 | Scriven et al. | 523/404 |
| 4,220,679 A | 9/1980 | Backhouse | 427/401 |
| 4,403,003 A | 9/1983 | Backhouse | 427/407.1 |
| 4,681,811 A | 7/1987 | Simpson et al. | 428/413 |
| 4,705,821 A | 11/1987 | Ito et al. | 524/407 |
| 4,728,545 A | 3/1988 | Kurauchi et al. | 427/409 |
| 4,732,790 A | 3/1988 | Blackburn et al. | 427/407.1 |
| 4,777,213 A | 10/1988 | Kanda et al. | 525/114 |
| 4,798,746 A | 1/1989 | Claar et al. | 427/407.1 |
| 4,880,867 A | 11/1989 | Gobel et al. | 524/507 |
| 5,071,904 A | 12/1991 | Martin et al. | 524/458 |
| 5,084,541 A | 1/1992 | Jacobs, III et al. | 528/45 |
| 5,098,947 A | 3/1992 | Metzger et al. | 524/507 |
| 5,102,925 A | 4/1992 | Suzuki et al. | 523/500 |
| 5,196,485 A | 3/1993 | McMonigal et al. | 525/327.3 |
| 5,212,273 A | 5/1993 | Das et al. | 526/323.1 |
| 5,569,715 A | 10/1996 | Grandhee | 525/7 |
| 5,593,733 A | 1/1997 | Mayo | 427/407.2 |
| 5,663,240 A | 9/1997 | Simeone et al. | 525/327.3 |
| 5,786,420 A | 7/1998 | Grandhee | 525/7 |
| 5,969,030 A | 10/1999 | Grandhee | 524/457 |
| 6,025,031 A | 2/2000 | Lettmann et al. | 427/388.4 |
| 6,281,272 B1 | 8/2001 | Baldy et al. | 523/501 |
| 6,291,564 B1 | 9/2001 | Faler et al. | 524/284 |
| 6,329,020 B1 | 12/2001 | Patzschke et al. | 427/407.1 |

FOREIGN PATENT DOCUMENTS

| | | | |
|---|---|---|---|
| EP | 0 216 479 | 4/1987 | C08F/246/00 |
| EP | 0 358 221 | 3/1990 | C09D/5/44 |
| WO | 95/09890 | 4/1995 | C08L/33/02 |

OTHER PUBLICATIONS

Hong et al., "Core/Shell Acrylic Microgel as the Main Binder of Waterborne Metallic Basecoats," Korea Polymer Journal, vol. 7, No. 4, pp. 213–222, 1999.

Odian, George, *Principles of Polymerization*, Second Edition, John Wiley & Sons, New York, NY, pp. 319–331, 1983.

Primary Examiner—Satya B. Sastri
(74) Attorney, Agent, or Firm—Deborah M. Altman

(57) ABSTRACT

A latex emulsion that includes crosslinked polymeric microparticles dispersed in an aqueous continuous phase. The microparticles are prepared from a monomer mix of a crosslinking monomer, a monomer having hydrophilic functional groups, and one or more other monomers. Also disclosed is a thermosetting composition that includes a first reactant that has reactive functional groups; a curing agent that has at least two functional groups reactive with the functional groups of the first reactant; and the latex emulsion of crosslinked polymeric microparticles dispersed in an aqueous continuous phase. The thermosetting composition may be used to coat a substrate. The coating may be a multi-layer composite coating that includes a base coat layer deposited from a pigmented film-forming base coat composition containing the thermosetting composition; and a substantially pigment free top coat layer deposited over a portion of the base coat layer from a substantially pigment free top coat composition.

71 Claims, No Drawings

HIGHLY CROSSLINKED POLYMER PARTICLES AND COATING COMPOSITIONS CONTAINING THE SAME

This application is related to copending U.S. patent application Ser. No. 10/126,903, entitled "Coating Compositions Containing a Polyurethane Dispersion and Highly Crosslinked Polymer Particles" of Frank Haley et al., also filed Apr. 19, 2002.

BACKGROUND OF THE INVENTION

1. Field of the Invention

The present invention relates to dispersions of crosslinked polymeric microparticles and thermosetting compositions containing such dispersions. More particularly, the present invention is directed to coating compositions containing crosslinked polymeric microparticles used in multi-component composite coating compositions such as primers, pigmented or colored basecoats, and/or transparent topcoats which provide good smoothness and appearance.

2. Background of the Invention

Over the past decade, there has been a concerted effort to reduce atmospheric pollution caused by volatile solvents which are emitted during painting processes. However, it is often difficult to achieve high quality, smooth coating finishes, such as are required in the automotive industry, without the inclusion of organic solvents which contribute greatly to flow and leveling of a coating.

Due to environmental concerns, volatile organic compounds ("VOCs") and/or Hazardous Air Pollutants ("HAPs") have come under strict regulation by the government. Therefore, one of the major goals of the coatings industry is to minimize the use of organic solvents by formulating waterborne coating compositions which provide a smooth, high gloss appearance, as well as good physical properties including resistance to acid rain. Unfortunately, many waterborne coating compositions, particularly those containing metallic flake pigments, do not provide acceptable appearance properties because, inter alia, they can deposit as a rough film under conditions of low humidity. Although smooth films can be obtained if the humidity is controlled within narrow limits, this often is not possible in industrial applications without incurring considerable expense.

The paint application process in an automotive industrial paint shop consists of four steps: storage in a tank; circulation in pipelines; spraying via a bell and/or a spray gun nozzle; and film formation on the surface of the substrate. The shear rates active on the paint in each of the steps are quite different and require varying paint rheological properties for each step. To design proper paint viscosity in waterborne automotive coatings, a distinct rheology profile is needed to provide good sprayability, sag resistance and levelling properties simultaneously. In basecoat compositions, shear thinning flow behavior is usually preferred. In many cases, special rheology control agents are used in coating formulations to provide the desired flow behavior.

Microgels or crosslinked microparticles have been used in the paint industry to improve the Theological properties properties of coating compositions as well as the physical properties of the coating, such as tensile strength, solvent resistance, and gas permeability. A particular goal has been to provide good sprayability, sag resistance and leveling properties simultaneously. In basecoat paints, proper shear thinning flow behavior is required to achieve this goal.

Basecoat coating compositions containing "effect" or reflective pigments, such as metallic flake pigments e.g., aluminum flake and micaceous pigments have increased in popularity in recent years because of the "glamorous" and distinctive chromic effects they provide. In such coatings, orientation of the aluminum flakes parallel to the surface of the substrate produces a unique metallic effect often referred to as "flip-flop" or "flop". A higher flop effect provides a more desired, brighter metallic appearance having a high level of color transition or "travel" with changes in viewing angle. The rheological properties of the coating composition, especially as affected by microgels, can greatly impact the flop property by promoting proper metallic flake orientation.

U.S. Pat. No. 6,291,564 to Faler, et al. discloses an aqueous coating composition that includes a crosslinkable film-forming resin and polymeric microparticles. However, under certain application conditions, the coating compositions can provide less than optimal appearance properties when metallic flake pigments are included in the coating composition. For example, the coatings can be prone to mottling (that is, an uneven distribution of metal flakes in the cured film) and sometimes do not have a smooth appearance. Furthermore, the resulting aqueous coating may include an unacceptable level of HAPs in the form of organic solvents.

Hong et al., "Core/Shell Acrylic Microgel as the Main Binder of Waterborne Metalic Basecoats", *Korea Polymer Journal*, Vol. 7, No. 4, pp 213–222 (1999) discloses an alkali swellable core/shell acrylic microgel emulsions having a hydrophobic core and a shell that included low levels of 2-hydroxyethyl acrylate and/or methacrylic acid as well as up to 8% crosslinking monomer content. The microgels provide pseudoplastic or shear thinning behavior in aqueous metallic basecoats. Addition of an alkali is required to promote swelling of the microgel, which can be problematic in achieving reproducible rheological properties.

Polymeric microparticles may be prepared by latex emulsion polymerization, where a suitable crosslinking monomer is included in the dispersed, water insoluble monomer phase. The macroscopic interactions and kinetics of latex emulsion polymerizations are generally described by the Smith-Ewart model. In the latex emulsion polymerization technique, water-insoluble or slightly water-soluble monomers are added to an aqueous continuous phase and form dispersed monomer droplets. A very small fraction of the monomers go into solution and form monomer micelles. A free radical source is added to the emulsion and polymerization is initiated within the micelles, to which additional monomer is fed from the monomer droplets. The end result is polymer particles dispersed in an aqueous continuous phase. See *Principles of Polymerization*, Second Edition, Odian, Wiley-Interscience, pp. 319–331 (1983).

When water soluble monomers are incorporated into the monomer mix in a latex emulsion polymerization process, initiation of polymerization in the aqueous continuous phase can result. When water-soluble monomers are polymerized in the aqueous continuous phase of a latex emulsion polymerization, the resulting polymer typically ranges from grit or coagulum to a thick solution or gel, rather than a dispersed polymer particle. The risk of such adverse results has limited the use of water-soluble monomers in latex emulsion polymerization processes.

U.S. Pat. No. 5,102,925 to Suzuki, et al. discloses an air-drying paint composition that includes internally crosslinked polymer microparticles, a film-forming resin and a volatile organic solvent. The use of thermosetting resins in the paint composition is not disclosed. The microparticles are produced by emulsion polymerization of ethylenically unsaturated monomers and at least one cross-linking monomer in the presence of an emulsifier.

U.S. Pat. No. 4,705,821 to Ito, et al. discloses an anticorrosive metal surface pretreating composition that includes an aqueous emulsion of hard polymer microparticles and a water soluble chromium compound. The polymer microparticles are prepared by emulsion polymerization of mono-unsaturated monomers and polyfunctional monomers.

European Patent Application No. 0 358 221 to Grutter et al. discloses electrodeposition coatings that include an aqueous dispersion of a cathodic or anodic deposition resin and polymer microparticles. The polymer microparticles include 0.1 to 5%, less than 2% by example, of monomers containing hydrophilic groups.

Generally, the known microgel thickeners used in aqueous basecoat coating compositions are deficient in that the resultant basecoatings can be susceptible to penetration by a solvent-based clear topcoat into the cured basecoat (commonly referred to as "soak in" or "strike in") and typically are only effective with certain limited clearcoats. Further, additional rheology modifiers or thickeners are often required to ensure a desired rheological profile for the cured coating composition, which also typically include HAPs solvents. Even with the additional rheology modifiers, these coating compositions can exhibit poor flow properties resulting in spray application difficulties and/or sagging upon application; moreover, these coatings can exhibit mottling, and/or a rough appearance.

It would be desirable to provide a thermosetting waterborne coating composition that contains metallic flake pigments, which is useful as an original finish, contains low or no VOC or HAPs materials, and has an optimal shear thinning flow profile while providing desirable appearance properties, to yield a smooth appearance, with high flip-flop, and no mottling.

SUMMARY OF THE INVENTION

The present invention is directed to a latex emulsion that includes crosslinked polymeric microparticles dispersed in an aqueous continuous phase. The polymeric microparticles are prepared from a monomer mix that includes:

(a) at least 20 weight percent of a crosslinking monomer having two or more sites of reactive unsaturation and/or monomers having one or more functional groups capable of reacting to form crosslinks after polymerization;

(b) at least 2 weight percent of a polymerizable ethylenically unsaturated monomer having hydrophilic functional groups having structures (I) and/or (II):

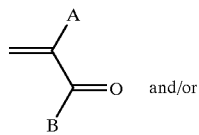

and/or

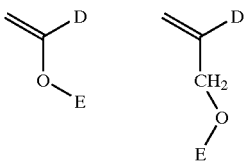

where A is selected from H and $C_1$–$C_3$ alkyl, B is selected from —$NR^1R^2$, —$OR^3$ and —$SR^4$, where $R^1$ and $R^2$ are independently selected from H, $C_1$–$C_{18}$ alkyl, $C_1$–$C_{18}$ alkylol and $C_1$–$C_{18}$ alkylamino, $R^3$ and $R^4$ are independently selected from $C_1$–$C_{18}$ alkylol, $C_1$–$C_{18}$ alkylamino, —$CH_2CH_2$—$(OCH_2CH_2)_n$—OH where n is 0 to 30, and, —$CH_2CH_2$—$(OC(CH_3)HCH_2)_m$—OH where m is 0 to 30, D is selected from H and $C_1$–$C_3$ alkyl; and E is selected from —$CH_2CHOHCH_2OH$, $C_1$–$C_{18}$ alkylol, —$CH_2CH_2$—$(OCH_2CH_2)_n$—OH where n is 0 to 30, and —$CH_2CH_2$—$(OC(CH_3)HCH_2)_m$—OH where m is 0 to 30; and (c) optionally, the balance being one or more other polymerizable ethylenically unsaturated monomers, where (a), (b) and (c) are different from each other.

The present invention is further directed to a thermosetting composition that includes (I) a first reactant that has reactive functional groups; (II) a curing agent that has functional groups reactive with the functional groups of the first reactant in (I); and (III) the latex emulsion of crosslinked polymeric microparticles dispersed in an aqueous continuous phase described above.

The present invention is additionally directed to a method of coating a substrate. The method includes (A) applying the thermosetting composition described above over at least a portion of the substrate; (B) coalescing the thermosetting composition to form a substantially continuous film on the substrate; and (C) curing the thermosetting composition. The present invention is still further directed to a substrate coated by the above-described method.

The present invention is also directed to a multi-layer composite coating. The multi-layer composite coating includes: (A) a base coat layer deposited from an effect pigment-containing film-forming base coat composition, where the base coat composition includes the above-described thermosetting composition; and (B) a substantially pigment free top coat layer deposited over at least a portion of the base coat layer from a substantially pigment free top coat composition.

The present invention is additionally directed to a coated substrate that includes (A) a substrate, and (B) the multi-layer composite coating composition described above over at least a portion of the substrate.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the term "substantially free" is meant to indicate that a material can be present in an incidental amount. In other words, the material is not intentionally added to an indicated composition, but may be present at minor or inconsequential levels, for example, because it was carried over as an impurity as part of an intended composition component.

As used herein, by "thermosetting composition" is meant one which "sets" irreversibly upon curing or crosslinking, wherein the polymer chains of the polymeric components are joined together by covalent bonds. This property is usually associated with a cross-linking reaction of the composition constituents often induced, for example, by heat or radiation. Hawley, Gessner G., *The Condensed Chemical Dictionary*, Ninth Edition., page 856; *Surface Coatings*, vol. 2, Oil and Colour Chemists' Association, Australia, TAFE Educational Books (1974). Curing or crosslinking reactions also may be carried out under ambient conditions. Once cured or crosslinked, a thermosetting composition will not melt upon the application of heat and is insoluble in solvents. By contrast, a "thermoplastic composition" comprises polymeric components which are not joined by covalent bonds and thereby can undergo liquid flow upon heating and are soluble in solvents. Saunders, K. J., *Organic Polymer Chemistry*, pp. 41–42, Chapman and Hall, London (1973).

As used herein, the term "polymer" is meant to encompass oligomers, and includes without limitation both homopolymers and copolymers. Also, as used herein, the term "reactive" refers to a functional group that forms a covalent bond with another functional group under conditions sufficient to cure the composition. As used herein, "(meth)acrylate" and like terms is intended to include both acrylates and methacrylates.

As used herein, the term "polyisocyanate" is intended to include blocked (or capped) isocyanates as well as unblocked (poly)isocyanates.

As used herein, by "substantially pigment-free coating composition" is meant a coating composition which forms a transparent coating, such as a clearcoat in a multi-component composite coating composition. Such compositions are sufficiently free of pigment or particles such that the optical properties of the resultant coatings are not seriously compromised. As used herein, "transparent" means that the cured coating has a BYK Haze index of less than 50 as measured using a BYK/Haze Gloss instrument.

As used herein, the phrase components "are different from each other" refers to components which do not have the same chemical structure as other components in the composition.

As used herein, the term "cure" as used in connection with a composition, e.g., "composition when cured," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking.

The present invention is directed to a latex emulsion that includes crosslinked polymeric microparticles dispersed in an aqueous continuous phase. The polymeric microparticles may be prepared from a monomer mix that includes:

(a) a crosslinking monomer having two or more sites of reactive unsaturation and/or monomers having one or more functional groups capable of reacting to form crosslinks after polymerization;

(b) a polymerizable ethylenically unsaturated monomer having hydrophilic functional groups having the following structures (I) and/or (II):

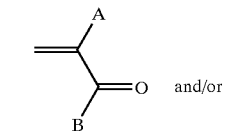 (I)

and/or

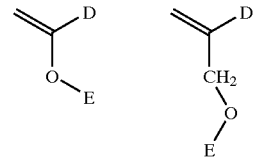 (II)

wherein A is selected from H and $C_1$–$C_3$ alkyl; B is selected from —$NR^1R^2$, —$OR^3$ and —$SR^4$, where $R^1$ and $R^2$ are independently selected from H, $C_1$–$C_{18}$ alkyl, $C_1$–$C_{18}$ alkylol and $C_1$–$C_{18}$ alkylamino, $R^3$ and $R^4$ are independently selected from $C_1$–$C_{18}$ alkylol, $C_1$–$C_{18}$ alkylamino, —$CH_2CH_2$—$(OCH_2CH_2)_n$—OH where n is 0 to 30, and, —$CH_2CH_2$—$(OC(CH_3)HCH_2)_m$—OH where m is 0 to 30, D is selected from H and $C_1$–$C_3$ alkyl; and E is selected from —$CH_2CHOHCH_2OH$, $C_1$–$C_{18}$ alkylol, —$CH_2CH_2$—$(OCH_2CH_2)_n$—OH where n is 0 to 30, and —$CH_2CH_2$—$(OC(CH_3)HCH_2)_m$—OH where m is 0 to 30; and optionally (c) one or more polymerizable ethylenically unsaturated monomers, where (a), (b) and (c) are different from each other.

By "alkylol" is meant a hydrocarbon radical that contains one or more hydroxyl groups. By "alkylamino" is meant a hydrocarbon radical that contains one or more amine groups. As used herein, when referring to the latex emulsion that includes crosslinked polymeric microparticles dispersed in an aqueous continuous phase, a "suitable" material is a material that may be used in or in preparing the latex emulsion that includes crosslinked polymeric microparticles dispersed in an aqueous continuous phase, so long as the material does not substantially affect the stability of the latex emulsion or the polymerization process.

Crosslinking monomers suitable for use as the crosslinking monomer (a) can include any monomer having two or more sites of reactive unsaturation, or any monomer that has one or more functional groups capable of reacting to form crosslinks after polymerization. As used herein, functional groups that are capable of reacting to form crosslinks after polymerization refer to functional groups on a first polymer molecule that may react under appropriate conditions to form covalent bonds with functional groups on a second polymer molecule to form a crosslinked polymer. Functional groups that may react to form crosslinks include, but are not limited to N-alkoxymethyl amides, N-methylolamides, lactones, lactams, mercaptans, hydroxyls, epoxides and the like. Examples of such monomers include, but are not limited to, N-alkoxymethyl(meth)acrylamides, γ-(meth)acryloxytrialkoxysilane, N-methylol(meth)acrylamide, N-butoxymethyl(meth)acrylamide, (meth)acryliclactones, N-substituted (meth)acrylamide lactones, (meth)acryliclactams, and N-substituted (meth)acrylamide lactams and glycidyl (meth)acrylate.

As mentioned above, in one embodiment of the present invention, the crosslinking monomer can have two sites of reactive unsaturation. In a further embodiment, the crosslinking monomer may be one or more of ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalte, divinyl benzene, methylol (meth)acrylamide, triallylamine, and methylenebis(meth) acrylamide.

The crosslinking monomer (a) comprises at least 15 weight percent, typically at least 20 weight percent, in many cases at least 22.5 weight percent, and in some cases at least 25 weight percent of the monomer mix used to prepare the polymeric microparticles. Also, the crosslinking monomer comprises not more than 45 weight percent, in many cases not more than 40 weight percent, typically not more than 35 weight percent, and in some cases not more than 30 weight percent of the monomer mix used to prepare the polymeric microparticles. The level of the crosslinking monomer (a) used is determined by the desired properties that are to be incorporated into the resulting microparticle. The crosslinking monomer may be present in the monomer mix at any value or in any combination of the recited ranges inclusive of those values stated above.

Any of the polymerizable ethylenically unsaturated monomers having hydrophilic functional groups described by structures I and/or II above may be used as the monomer (b) provided that the monomer can be polymerized in a latex emulsion polymerization system and does not substantially affect the stability of the latex emulsion or the polymerization process.

Polymerizable ethylenically unsaturated monomers having hydrophilic functional groups suitable for use as the monomer (b) in the preparation of the polymeric microparticles of the present invention include, but are not limited to (meth)acrylamide, hydroxyethyl(meth)acrylate, hydroxypropyl(meth)acrylate, dimethylaminoethyl(meth)acrylate, allyl glycerol ether, methallyl glycerol ether and polyethyleneoxide allyl ether.

In an embodiment of the present invention, a particular advantage of the present crosslinked polymeric microparticles is that they do not require the presence of an alkaline material to swell the microparticles, thereby providing desired rheological properties. This eliminates the additional processing step of adding an alkaline material to promote particle swelling and renders the resulting rheological properties more predictable.

In another embodiment of the present invention, the polymerizable ethylenically unsaturated monomers having hydrophilic functional groups (b) include only monomers described by structure (I) above.

In a further embodiment of the present invention, the polymerizable ethylenically unsaturated monomers having hydrophilic functional groups (b) include only monomers described by structure (II) above.

The polymerizable ethylenically unsaturated monomer having hydrophilic functional groups (b) comprises at least 2 weight percent, sometimes greater than 2 weight percent, often at least 5 weight percent, often greater than 5 weight percent, usually at least 7 weight percent, and typically at least 8 weight percent of the monomer mix used to prepare the polymeric microparticles. The polymerizable ethylenically unsaturated monomer having hydrophilic functional groups comprises not more than 35 weight percent, in many cases not more than 30 weight percent, typically not more than 20 weight percent, and often not more than 15 weight percent of the monomer mix used to prepare the polymeric microparticles. The level of the polymerizable ethylenically unsaturated monomer having hydrophilic functional groups used is determined by the properties that are to be incorporated into the resulting microparticle. The level of the polymerizable ethylenically unsaturated monomer having hydrophilic functional groups present in the monomer mix can range between any combination of the recited values inclusive of the recited values.

Polymerizable ethylenically unsaturated monomers suitable for use as the monomer (c) which, optionally, make up the remainder of the monomer mix, and which are different from the crosslinking monomer (a) and the monomer having hydrophilic functional groups (b), may be included in the polymeric microparticles of the present invention. Any suitable polymerizable ethylenically unsaturated monomer may be used, provided that is capable of being polymerized in a latex emulsion polymerization system and does not substantially affect the stability of the latex emulsion or the polymerization process. Suitable polymerizable ethylenically unsaturated monomers include, but are not limited to, methyl(meth)acrylate, ethyl(meth)acrylate, propyl(meth)acrylate, N-butyl(meth)acrylate, t-butyl(meth)acrylate, 2-ethylhexyl(meth)acrylate, isobornyl(meth)acrylate, dimethylaminoethyl(meth)acrylate, styrene, (meth)acrylonitrile, lauryl(meth)acrylate, cyclohexyl(meth)acrylate, and 3,3,5-trimethylcyclohexyl(meth)acrylate.

The polymerizable ethylenically unsaturated monomer (c) may comprise at least 20 weight percent, typically at least 30 weight percent, in many cases at least 40 weight percent, and in some cases at least 50 weight percent of the monomer mix used to prepare the polymeric microparticles. The polymerizable ethylenically unsaturated monomers may comprise not more than 80 weight percent, in many cases not more than 75 weight percent, typically not more than 70.5 weight percent, and in some cases not more than 67 weight percent of the monomer mix used to prepare the polymeric microparticles. The level of the polymerizable ethylenically unsaturated monomer (c) which can be used is determined by the properties that are to be incorporated into the resulting microparticle. The level of the polymerizable ethylenically unsaturated monomer (c) present in the monomer mix may range between any combination of the recited values inclusive of the recited values.

In a particular embodiment of the present invention, the crosslinking monomer (a) comprises one or more of glycol di(meth)acrylates and glycol tri(meth)acrylates; the polymerizable ethylenically unsaturated monomer having hydrophilic functional groups (b) comprises (meth)acrylamide; and the polymerizable ethylenically unsaturated monomer (c) comprises one or more alkyl(meth)acrylates.

The latex emulsion of crosslinked polymeric microparticles dispersed in an aqueous continuous phase is prepared by latex emulsion polymerization of (a), (b) and optionally, (c) as described above. In many cases, the monomer mixture of (a), (b) and (c) will readily disperse into stable monomer droplets and micelles as would be expected in a Smith-Ewart type of process. In such cases, no monomeric or polymeric emulsifiers and/or protective colloids are added to the latex emulsion, and the latex emulsion is substantially free of polymeric emulsifiers and/or protective colloids. It should be understood, however, that in some cases, a surface active agent may be added to the aqueous continuous phase to stabilize, or prevent coagulation or agglomeration of the monomer droplets, especially during polymerization.

The surface active agent can be present in the latex emulsion of the present invention at any level that stabilizes the emulsion. The surface active agent may be present at least 0.001 percent by weight, often times at least 0.005 percent by weight, typically at least 0.01 percent by weight, and in some cases at least 0.05 percent by weight based on the total weight of the latex emulsion. The surface active agent may be present at up to 10 percent by weight, often times up to 7.5 percent by weight, typically up to 5 percent by weight, and in some cases up to 3 percent by weight based on the total weight of the latex emulsion. The level of the surface active agent used is determined by the amount required to stabilize the latex emulsion. The surface active agent may be present in the latex emulsion at any level or in any range of levels inclusive of those stated above.

The surface active agent may be an anionic, cationic, or nonionic surfactant or dispersing agent, or compatible mixtures thereof, such as a mixture of an anionic and a nonionic surfactant. Suitable cationic dispersion agents include, but are not limited to lauryl pyridinium chloride, cetyldimethyl amine acetate, and alkyldimethylbenzylammonium chloride, in which the alkyl group has from 8 to 18 carbon atoms. Suitable anionic dispersing agents include, but are not limited to alkali fatty alcohol sulfates, such as sodium lauryl sulfate, and the like; arylalkyl sulfonates, such as potassium isopropylbenzene sulfonate, and the like; alkali alkyl sulfosuccinates, such as sodium octyl sulfosuccinate, and the like; and alkali arylalkylpolyethoxyethanol sulfates or sulfonates, such as sodium octylphenoxypolyethoxyethyl sulfate, having 1 to 5 oxyethylene units, and the like. Suitable non-ionic surface active agents include but are not limited to alkyl phenoxypolyethoxy ethanols having alkyl groups of from about 7 to 18 carbon atoms and from about 6 to about 60 oxyethylene units such as, for example, heptyl phenoxypolyethoxyethanols; ethylene oxide derivatives of long chained carboxylic acids such as lauric acid, myristic acid, palmitic acid, oleic acid, and the like, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long-chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers such as hydroxyethyl cellulose, methyl cellulose, polyacrylic acid, polyvinyl alcohol, and the like, may be used as emulsion stabilizers and protective colloids.

A free radical initiator typically is used in the latex emulsion polymerization process. Any suitable free radical initiator may be used. Suitable free radical initiators include, but are not limited to thermal initiators, photoinitiators and oxidation-reduction initiators, all of which may be otherwise categorized as being water-soluble initiators or non-water-soluble initiators. Examples of thermal initiators include, but are not limited to azo compounds, peroxides and persulfates. Suitable persulfates include, but are not limited to sodium persulfate and ammonium persulfate. Oxidation-reduction initiators may include, as non-limiting examples persulfate-sullfite systems as well as systems utilizing thermal initiators in combination with appropriate metal ions such as iron or copper.

Suitable azo compounds include, but are not limited to non-water-soluble azo compounds such as 1-1'-azobiscyclohexanecarbonitrile), 2-2'-azobisisobutyronitrile, 2-2'-azobis(2-methylbutyronitrile), 2-2'-azobis (propionitrile), 2-2'-azobis(2,4-dimethylvaleronitrile), 2-2'-azobis(valeronitrile), 2-(carbamoylazo)-isobutyronitrile and mixtures thereof; and water-soluble azo compounds such as azobis tertiary alkyl compounds include, but are not limited to, 4-4'-azobis(4-cyanovaleric acid), 2-2'-azobis(2-methylpropionamidine) dihydrochloride, 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine) dihydrochloride and mixtures thereof.

Suitable peroxides include, but are not limited to hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides, peroxyketals and mixtures thereof.

In one embodiment of the present invention, the average particle size of the polymeric microparticles may be at least 0.001 microns, in many cases at least 0.005 microns, typically at least 0.01 and in some cases at least 0.02 microns. The average particle size of the polymeric microparticles typically is no more than 1 micron, in many cases less than 1 micron, often not more than 0.9 microns and usually not more than 0.8 microns. When the average particle size is too large, the microparticles may tend to settle from the latex emulsion upon storage. The average particle size of the polymeric microparticles may be any value or in any range of values inclusive of those stated above.

In another embodiment of the present invention, the latex emulsion of crosslinked polymeric microparticles dispersed in an aqueous continuous phase is prepared by a seeded latex emulsion polymerization process. Such a seeded latex emulsion polymerization process includes:

(I) providing an overall monomer composition that includes constituent parts of:
  (a) at least 20 weight percent of the overall monomer composition including a crosslinking monomer such as any of those described in detail above;
  (b) at least 2 weight percent of the overall monomer composition of a polymerizable ethylenically unsaturated monomer having hydrophilic functional groups such as any of those having the structures (I) or (II) described above; and
  (c) the balance of the overall monomer composition including one or more polymerizable ethylenically unsaturated monomers such as any of those described in detail above with respect to the monomer (c) above, where (a), (b) and (c) are different from each other;

(II) polymerizing a portion of the overall monomer mix, the portion including from 0.1 to 20 weight percent of (a) and from 0.1 to 20 weight percent of (c) to form polymeric seeds dispersed in the continuous phase; and (III) polymerizing the remainder of monomers (a), (b) and (c) in the presence of the dispersed polymeric seeds prepared in step (II) to form a latex emulsion of seeded polymeric microparticles.

While not being limited to a single theory, it is believed that the resulting latex emulsion of seeded polymeric microparticles has improved stability. By "improved stability" is meant improved resistance to settling of the microparticles. In the seeded emulsion polymerization, it is believed that the polymerizable, ethylenically unsaturated monomers having hydrophilic functional groups are incorporated primarily on the surface of the microparticles. This structure adds a considerable electrostatic and/or steric repulsion component to the microparticles, thereby avoiding agglomeration and/or settling of the resulting microparticles. Further, the polymerizable ethylenically unsaturated monomer having hydrophilic functional groups are more likely to agglomerate and form micelles at the hydrophobic seeds formed from a portion of (a) and a portion of (c). Hence, the ethylenically unsaturated monomer(s) having hydrophilic functional groups are less likely to polymerize in the continuous phase forming undesirable grit, coagulum or gel.

A further embodiment of the present invention is directed to a thermosetting composition that includes:

(I) a first reactant comprising reactive functional groups;

(II) a curing agent having functional groups reactive with the functional groups of the first reactant (I); and (III) the latex emulsion of crosslinked polymeric microparticles dispersed in an aqueous continuous phase as described in detail above. The thermosetting composition may be in any suitable physical form, for example in liquid form, such as a solution, dispersion or emulsions, and in solid form, for example, a dry, particulate powder. In a particular embodiment of the present invention, the thermosetting composition is a coating composition.

In the thermosetting composition of the present invention, the first reactant (I) can include any reactive functional groups. For example, the functional groups can comprise one or more of epoxy, carboxylic acid, hydroxy, amide, oxazoline, aceto acetate, isocyanate, methylol, amino, methylol ether, and carbamate. Likewise, the functional groups of the curing agent (II) can include any reactive functional groups, provided such groups are reactive with those of the first reactant (I). For example, the functional groups of the curing agent (II) can comprise one or more of epoxy, carboxylic acid, hydroxy, isocyanate, capped isocyanate, amine, methylol, methylol ether, and beta-hydroxyalkylamide. Generally, the functional groups of (I) and (II) will be different from and reactive with each other.

Examples of the first reactant (I) which are suitable for use in the thermosetting compositions of the present invention include, but are not limited to, film-forming polymers with at least one reactive functional group. Such polymers can include any of a variety of functional polymers known in the art. For example, suitable hydroxyl group-containing polymers can include acrylic polyols, polyester polyols, polyurethane polyols, polyether polyols, and mixtures thereof. In a particular embodiment of the present invention, the film-forming polymer comprises an acrylic polyol having a hydroxyl equivalent weight ranging from 1000 to 100 grams per solid equivalent, typically 500 to 150 grams per solid equivalent.

Suitable hydroxyl group and/or carboxyl group-containing acrylic polymers can be prepared from polymerizable ethylenically unsaturated monomers and are typically copolymers of (meth)acrylic acid and/or hydroxyalkyl esters of (meth)acrylic acid with one or more other polymerizable ethylenically unsaturated monomers such as alkyl esters of (meth)acrylic acid including methyl(meth)acrylate, ethyl(meth)acrylate, butyl(meth)acrylate and 2-ethyl hexylacrylate, and vinyl aromatic compounds such as styrene, alpha-methyl styrene, and vinyl toluene.

In an embodiment of the present invention the acrylic polymer can be prepared from ethylenically unsaturated, beta-hydroxy ester functional monomers. Such monomers can be derived from the reaction of an ethylenically unsaturated acid functional monomer, such as monocarboxylic acids, for example, acrylic acid; and an epoxy compound which does not participate in the free radical initiated polymerization with the unsaturated acid monomer. Examples of such epoxy compounds include glycidyl ethers and esters. Suitable glycidyl ethers include glycidyl ethers of alcohols and phenols such as butyl glycidyl ether, octyl glycidyl ether, phenyl glycidyl ether and the like. Suitable glycidyl esters include those which are commercially available from Shell Chemical Company under the tradename CARDURA E; and from Exxon Chemical Company under the tradename GLYDEXX-10. Alternatively, the beta-hydroxy ester functional monomers can be prepared from an ethylenically unsaturated, epoxy functional monomer, for example glycidyl (meth)acrylate and allyl glycidyl ether, and a saturated carboxylic acid, such as a saturated monocarboxylic acid, for example isostearic acid.

Epoxy functional groups can be incorporated into the polymer prepared from polymerizable ethylenically unsaturated monomers by copolymerizing oxirane group-containing monomers, for example glycidyl (meth)acrylate and allyl glycidyl ether, with other polymerizable ethylenically unsaturated monomers, such as those discussed above. Preparation of such epoxy functional acrylic polymers is described in detail in U.S. Pat. No. 4,001,156 at columns 3 to 6, incorporated herein by reference.

Carbamate functional groups can be incorporated into the polymer prepared from polymerizable ethylenically unsaturated monomers by copolymerizing, for example, the above-described ethylenically unsaturated monomers with a carbamate functional vinyl monomer such as a carbamate functional alkyl ester of methacrylic acid. Useful carbamate functional alkyl esters can be prepared by reacting, for example, a hydroxyalkyl carbamate, such as the reaction product of ammonia and ethylene carbonate or propylene carbonate, with methacrylic anhydride. Other useful carbamate functional vinyl monomers include, for instance, the reaction product of hydroxyethyl methacrylate, isophorone diisocyanate, and hydroxypropyl carbamate; or the reaction product of hydroxypropyl methacrylate, isophorone diisocyanate, and methanol. Still other carbamate functional vinyl monomers may be used, such as the reaction product of isocyanic acid (HNCO) with a hydroxyl functional acrylic or methacrylic monomer such as hydroxyethyl acrylate, and those described in U.S. Pat. No. 3,479,328, incorporated herein by reference. Carbamate functional groups can also be incorporated into the acrylic polymer by reacting a hydroxyl functional acrylic polymer with a low molecular weight alkyl carbamate such as methyl carbamate. Pendant carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether. Also, hydroxyl functional acrylic polymers can be reacted with isocyanic acid to provide pendent carbamate groups. Likewise, hydroxyl functional acrylic polymers can be reacted with urea to provide pendent carbamate groups.

The acrylic polymers, that is, those prepared from polymerizable ethylenically unsaturated monomers, can be prepared by solution polymerization techniques, which are well-known to those skilled in the art, in the presence of suitable catalysts such as organic peroxides or azo compounds, as described above. The polymerization can be carried out in an organic solution in which the monomers are soluble by techniques conventional in the art. Alternatively, these polymers can be prepared by aqueous emulsion or dispersion polymerization techniques which are well-known in the art. The ratio of reactants and reaction conditions are selected to result in an acrylic polymer with the desired pendent functionality.

Polyester polymers are also useful in the coating compositions of the invention as the film-forming polymer. Useful polyester polymers typically include the condensation products of polyhydric alcohols and polycarboxylic acids. Suitable polyhydric alcohols can include ethylene glycol, neopentyl glycol, trimethylol propane, and pentaerythritol. Suitable polycarboxylic acids can include adipic acid, 1,4-cyclohexyl dicarboxylic acid, and hexahydrophthalic acid. Besides the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions are selected to result in a polyester polymer with the desired pendent functionality, i.e., carboxyl or hydroxyl functionality.

For example, hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air-drying, suitable drying oil fatty acids may be used and include those derived from linseed oil, soy bean oil, tall oil, dehydrated castor oil, or tung oil.

Carbamate functional polyesters can be prepared by first forming a hydroxyalkyl carbamate that can be reacted with the polyacids and polyols used in forming the polyester. Alternatively, terminal carbamate functional groups can be incorporated into the polyester by reacting isocyanic acid with a hydroxy functional polyester. Also, carbamate functionality can be incorporated into the polyester by reacting a hydroxyl polyester with a urea. Additionally, carbamate groups can be incorporated into the polyester by a transcarbamoylation reaction. Preparation of suitable carbamate functional group-containing polyesters are those described in U.S. Pat. No. 5,593,733 at column 2, line 40 to column 4, line 9, incorporated herein by reference.

Polyurethane polymers containing terminal isocyanate or hydroxyl groups also can be used as the polymer (d) in the coating compositions of the invention. The polyurethane polyols or NCO-terminated polyurethanes which can be used are those prepared by reacting polyols including polymeric polyols with polyisocyanates. Polyureas containing terminal isocyanate or primary and/or secondary amine groups which also can be used are those prepared by reacting polyamines including polymeric polyamines with polyisocyanates. The hydroxyl/isocyanate or amine/isocyanate equivalent ratio is adjusted and reaction conditions are selected to obtain the desired terminal groups. Examples of suitable polyisocyanates include those described in U.S. Pat. No. 4,046,729 at column 5, line 26 to column 6, line 28, incorporated herein by reference. Examples of suitable polyols include those described in U.S. Pat. No. 4,046,729 at column 7, line 52 to column 10, line 35, incorporated herein by reference. Examples of suitable polyamines include those described in U.S. Pat. No. 4,046,729 at column 6, line 61 to column 7, line 32 and in U.S. Pat. No. 3,799,854 at column 3, lines 13 to 50, both incorporated herein by reference.

Carbamate functional groups can be introduced into the polyurethane polymers by reacting a polyisocyanate with a polyester having hydroxyl functionality and containing pendent carbamate groups. Alternatively, the polyurethane can be prepared by reacting a polyisocyanate with a polyester polyol and a hydroxyalkyl carbamate or isocyanic acid as separate reactants. Examples of suitable polyisocyanates are aromatic isocyanates, such as 4,4'-diphenylmethane diisocyanate, 1,3-phenylene diisocyanate and toluene diisocyanate, and aliphatic polyisocyanates, such as 1,4-tetramethylene diisocyanate and 1,6-hexamethylene diisocyanate. Cycloaliphatic diisocyanates, such as 1,4-cyclohexyl diisocyanate and isophorone diisocyanate also can be employed.

Examples of suitable polyether polyols include polyalkylene ether polyols such as those having the following structural formulas (III) or (IV):

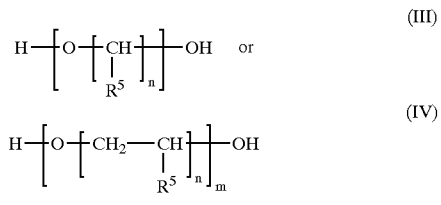

wherein the substituent $R^5$ is hydrogen or a lower alkyl group containing from 1 to 5 carbon atoms including mixed substituents, and n has a value typically ranging from 2 to 6 and m has a value ranging from 8 to 100 or higher. Exemplary polyalkylene ether polyols include poly(oxytetramethylene) glycols, poly (oxytetraethylene) glycols, poly(oxy-1,2-propylene) glycols, and poly(oxy-1,2-butylene) glycols.

Also useful are polyether polyols formed from oxyalkylation of various polyols, for example, glycols such as ethylene glycol, 1,6-hexanediol, Bisphenol A, and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Specific examples of polyethers include those sold under the names TERATHANE and TERACOL, available from E. I. Du Pont de Nemours and Company, Inc.

Generally, when the first reactant (I) comprises a polymer having reactive functional groups, the polymer will have a weight average molecular weight (Mw) typically ranging from 1,000 to 20,000, typically 1,500 to 15,000 and in many cases 2,000 to 12,000 as determined by gel permeation chromatography using a polystyrene standard.

Polyepoxides such as those described below with reference to the curing agent (II), can also be used as the first reactant (I).

The first reactant (I) may be present in the thermosetting compositions of the present invention in an amount of at least 2 percent by weight, usually at least 5 percent by weight, and typically at least 10 percent by weight based on weight of total resin solids in the coating composition. Also, the first reactant (I) may be present in the thermosetting compositions of the invention in an amount of not more than 80 percent by weight, usually not more than 60 percent by weight, and typically not more than 50 percent by weight based on weight of total resin solids in the thermosetting composition. The amount of the first reactant (I) in the thermosetting compositions of the present invention can range between any combination of these values inclusive of the recited values.

As aforementioned, in addition to the first reactant (I), and the latex emulsion of crosslinked polymeric microparticles (III), the thermosetting composition of the present invention further includes at least one curing agent (II) having functional groups reactive with the functional groups of the first reactant (I).

Dependent upon the reactive functional groups of the first reactant (I), the curing agent (II) can be selected from an aminoplast resin, a polyisocyanate, a blocked isocyanate, a polyepoxide, a polyacid, an anhydride, an amine, a polyol, a carboxylic acid, an hydroxy containing compound, a methylol containing compound, a methylol ether containing compound, a beta-hydroxyalkylamide, and mixtures of any of the foregoing.

In one embodiment, the curing agent (II) includes an aminoplast resin. Aminoplast resins, which may include phenoplasts, as curing agents for hydroxyl, carboxylic acid, and carbamate functional group-containing materials are well known in the art. Aminoplasts can be obtained from the condensation reaction of formaldehyde with an amine or amide. Nonlimiting examples of amines or amides include melamine, urea, or benzoguanamine. Condensates with other amines or amides can be used; for example, aldehyde condensates of glycoluril, which give a high melting crystalline product useful in powder coatings. While the aldehyde used is most often formaldehyde, other aldehydes such as acetaldehyde, crotonaldehyde, and benzaldehyde can be used.

The aminoplast resin can contain imino and methylol groups and in certain instances at least a portion of the methylol groups are etherified with an alcohol to modify the cure response. Any monohydric alcohol can be employed for this purpose including methanol, ethanol, n-butyl alcohol, isobutanol, and hexanol.

Nonlimiting examples of aminoplasts include melamine-, urea-, or benzoguanamine-formaldehyde condensates, which in certain instances are monomeric and at least partially etherified with one or more alcohols containing from one to four carbon atoms. Nonlimiting examples of suitable aminoplast resins are commercially available, for example, from Cytec Industries, Inc. under the trademark CYMEL® and from Solutia, Inc. under the trademark RESIMENE®.

In another embodiment of the present invention, the curing agent (II) includes an aminoplast resin which, when added to the other components that form the thermosetting composition, is generally present in an amount ranging from 2 weight percent to 65 weight percent, can be present in an amount ranging from 5 weight percent to 50 weight percent, and typically is present in an amount ranging from 5 weight percent to 40 weight percent based on total weight of resin solids present in the thermosetting composition.

In yet another embodiment of the present invention, the curing agent (II) includes a polyisocyanate curing agent. The polyisocyanate can be an aliphatic or an aromatic polyisocyanate, or a mixture of the foregoing two. Diisocyanates can be used, although higher polyisocyanates such as isocyanurates of diisocyanates are often used. Higher polyisocyanates also can be used in combination with diisocyanates. Isocyanate prepolymers, for example, reaction products of polyisocyanates with polyols also can be used. Mixtures of polyisocyanate curing agents can be used.

If the polyisocyanate is blocked (or capped), any suitable aliphatic, cycloaliphatic, or aromatic alkyl monoalcohol known to those skilled in the art can be used as a blocking agent for the polyisocyanate. Other suitable blocking agents include oximes and lactams. When used, the polyisocyanate curing agent (II) typically is present, when added to the other components which form the thermosetting composition of the present invention, in an amount ranging from 5 to 65 weight percent, can be present in an amount ranging from 10 to 45 weight percent, and often is present in an amount ranging from 15 to 40 percent by weight based on the total weight of resin solids present in the thermosetting composition.

Other useful curing agents can include blocked isocyanate compounds such as, for example, the tricarbamoyl triazine compounds described in detail in U.S. Pat. No. 5,084,541, which is incorporated by reference herein. When used, such blocked isocyante curing agent can be present, when added to the other components in the thermosetting composition, in an amount ranging up to 20 weight percent, and can be present in an amount ranging from 1 to 20 weight percent, based on the total weight of resin solids present in the thermosetting composition.

In one embodiment of the present invention, the curing agent (II) includes both an aminoplast resin and a polyisocyanate.

Anhydrides as curing agents for hydroxyl functional group-containing materials also are well known in the art and can be used in the present invention. Nonlimiting examples of anhydrides suitable for use as curing agents in the compositions of the invention include those having at least two carboxylic acid anhydride groups per molecule which are derived from a mixture of monomers comprising an ethylenically unsaturated carboxylic acid anhydride and at least one vinyl co-monomer, for example, styrene, alpha-methyl styrene, vinyl toluene, and the like. Nonlimiting examples of suitable ethylenically unsaturated carboxylic acid anhydrides include maleic anhydride, citraconic anhydride, and itaconic anhydride. Alternatively, the anhydride can be an anhydride adduct of a diene polymer such as maleinized polybutadiene or a maleinized copolymer of butadiene, for example, a butadiene/styrene copolymer. These and other suitable anhydride curing agents are described in U.S. Pat. No. 4,798,746 at column 10, lines 16–50; and in U.S. Pat. No. 4,732,790 at column 3, lines 41–57, both of which are incorporated herein by reference.

Polyepoxides as curing agents for carboxylic acid functional group-containing materials are well known in the art. Nonlimiting examples of polyepoxides suitable for use in the thermoseftingcompositions of the present invention comprise polyglycidyl esters (such as acrylics from glycidyl methacrylate), polyglycidyl ethers of polyhydric phenols and of aliphatic alcohols, which can be prepared by etherification of the polyhydric phenol, or aliphatic alcohol with an epihalohydrin such as epichlorohydrin in the presence of alkali. These and other suitable polyepoxides are described in U.S. Pat. No. 4,681,811 at column 5, lines 33 to 58, which is incorporated herein by reference.

Suitable curing agents for epoxy functional group-containing materials comprise polyacid curing agents, such as the acid group-containing acrylic polymers prepared from an ethylenically unsaturated monomer containing at least one carboxylic acid group and at least one ethylenically unsaturated monomer which is free from carboxylic acid groups. Such acid functional acrylic polymers can have an acid number ranging from 30 to 150. Acid functional group-containing polyesters can be used as well. The above-described polyacid curing agents are described in further detail in U.S. Pat. No. 4,681,811 at column 6, line 45 to column 9, line 54, which is incorporated herein by reference.

Also well known in the art as curing agents for isocyanate functional group-containing materials are polyols, that is, materials having two or more hydroxyl groups per molecule. Nonlimiting examples of such materials suitable for use in the compositions of the invention include polyalkylene ether polyols, including thio ethers; polyester polyols, including polyhydroxy polyesteramides; and hydroxyl-containing polycaprolactones and hydroxy-containing acrylic copolymers. Also useful are polyether polyols formed from the oxyalkylation of various polyols, for example, glycols such as ethylene glycol, 1,6-hexanediol, Bisphenol A and the like, or higher polyols such as trimethylolpropane, pentaerythritol, and the like. Polyester polyols also can be used. These and other suitable polyol curing agents are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33, both of which are incorporated herein by reference.

Polyamines also can be used as curing agents for isocyanate functional group-containing materials. Nonlimiting examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-porphylene diamine, 1,8-octane diamine, isophorone diamine, propane-2,2-cyclohexyl amine, and the like. Nonlimiting examples of suitable aromatic diamines include phenylene diamines and the toluene diamines, for example, o-phenylene diamine and p-tolylene diamine. These and other suitable polyamines described in detail in U.S. Pat. No. 4,046,729 at column 6, line 61 to column 7, line 26, which is incorporated herein by reference.

When a beta-hydroxyalkylamide curing agent is used, it may be represented by the following structure V:

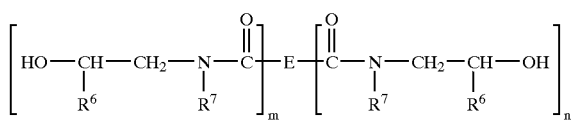

(V)

where $R^6$ is H or $C_1$–$C_5$ alkyl; $R^7$ is H, $C_1$–$C_5$ alkyl structure VI:

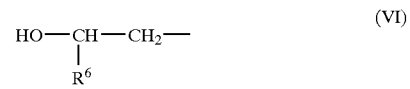

(VI)

for which $R^6$ is as described above, E is a chemical bond or monovalent or polyvalent organic radical derived from saturated, unsaturated, or aromatic hydrocarbon radicals including substituted hydrocarbon radicals containing from 2 to 20 carbon atoms, m is 1 or 2, n is from 0 to 2, and m+n is at least 2.

When desired, appropriate mixtures of curing agents may be used. It should be mentioned that the thermosetting compositions can be formulated as a one-component composition where a curing agent such as an aminoplast resin and/or a blocked isocyanate compound such as those described above is admixed with other composition components. The one-component composition can be storage stable as formulated. Alternatively, the thermosetting composition can be formulated as a two-component composition where a polyisocyanate curing agent such as those described above can be added to a pre-formed admixture of the other composition components just prior to application. The pre-formed admixture can comprise curing agents such as aminoplast resins and/or blocked isocyanate compounds such as those described above.

In a further embodiment, the thermosetting composition comprises a first reactant (I) which includes a polymer containing hydroxyl functional groups, and a curing agent (II) which includes one or more materials selected from polyamines, aminoplast resins and polyisocyanates.

In a particular embodiment of the present invention, the thermosetting composition comprises the following components:

(I) a first reactant comprising reactive functional groups;
(II) a curing agent having at least two functional groups reactive with the functional groups of the first reactant in (a); and
(III) the latex emulsion of seeded polymeric microparticles described above.

In another embodiment of the present invention, the thermosetting coating composition is a basecoat composition that may include one or more effect pigments. Nonlimiting examples of suitable effect pigments include, for example, metallic pigments such as aluminum flake and copper bronze flake, and micaceous pigments, for example, metal oxide coated mica. A particular advantage of the thermosetting coating composition of the present invention is improved flake orientation of metallic or micaceous pigments, resulting in improved coating appearance and enhanced Flop Index ratings as described below. The level of effect pigments present in the thermosetting composition of the present invention can vary dependent upon the other composition components, the desired color, and/or the end use of substrate to be coated.

In one embodiment of the present invention where the thermosetting composition comprises one or more effect pigments, the latex emulsion (III) is present in the composition in an amount sufficient to provide a Flop Index rating of 10 or greater, often 11 or greater, and typically 12 or greater.

By "Flop Index rating" as used herein, i.e., in the specification and the claims, is meant the value calculated using the following equation:

$$\text{FLOP INDEX RATING} = \frac{2.69 \times (L15 - L110)^{1.11}}{(L45)^{0.86}}$$

wherein L15 is a measurement of the amount of visible light reflected 15 degrees off specular (visually L15 corresponds to the color of the face angle);

wherein L45 is a measurement of the amount of light reflected 45 degrees off specular (visually L45 corresponds to the color of the flash angle); and wherein L110 is a measurement of the amount of light reflected 110 degrees off specular (visually L110 corresponds to the color of the flop angle).

For purposes of the present invention, Flop Index rating measurements were made using an Xrite MA68-11 flop index instrument available from Xrite Inc., Grandville, Mich.

Besides the metallic pigments, the basecoat compositions can contain nonmetallic color and/or filler pigments conventionally used in surface coatings such as, for example, inorganic pigments such as titanium dioxide, iron oxide, chromium oxide, lead chromate, and carbon black; and organic pigments such as phthalocyanine blue and phthalocyanine green.

Optional ingredients in the basecoat composition can comprise those which are well known in the art of formulating surface coatings, and can comprise surface active agents, flow control agents, thixotropic agents, fillers, antigassing agents, organic co-solvents, catalysts, and other customary adjuvants. Nonlimiting examples of these materials and suitable amounts are described in U.S. Pat. Nos. 4,220,679; 4,403,003; 4,147,679; and 5,071,904, which patents are incorporated herein by reference.

In a particular embodiment of the thermosetting composition of the present invention, further comprises an aqueous polyurethane dispersion in addition to component (I), (II) and (III). The inclusion of polyurethane dispersions in aqueous coating compositions for improving smoothness, flow and leveling of the coating film is known in the art. Any suitable polyurethane dispersion may be used in the present thermosetting composition. Examples of suitable polyurethane dispersions include, but are not limited to, those disclosed in U.S. Pat. No. 5,071,904 to Martin et al. (col. 4, line 40 to col. 9, line 8); U.S. Pat. No. 6,291,564 to Faler et al. (col. 3, line 32 to col. 4, line 52); U.S. Pat. No. 6,281,272 to Baldy et al. (col. 15, lines 52–66, see Table 1 footnote 9); U.S. Pat. No. 4,880,867 to Gob et al. (col. 7, line 29 to col. 12, line 68); U.S. Pat. No. 5,569,715 to Grandhee (in its entirety); and U.S. Pat. No. 6,025,031 to Lettmann et al. (col. 6, lines 30 to 43) the relevant portions of which are herein incorporated by reference.

The polyurethane dispersion is present in the thermosetting coating composition of the present invention in an amount sufficient to provide a smooth cured coating as measured using a Byk Gardner wave scan instrument.

Generally, the wave scan instrument is a measure of coating surface topography. The wave scan uses a point source (i.e. laser) to illuminate the coating surface over a predetermined distance, for example 10 centimeters, at 60°. The reflected light is measured at the same, but opposite angle. As the light beam hits a "peak" or "valley" of the surface, a maximum signal is detected; when the beam hits a "slope" of a peak/valley a minimum signal is registered. Hence, the measured signal frequency is equal to double spatial frequency of the coating surface topography. That is, the wave scan instrument measures the optical profile of the cured coating surface.

The surface "waveness" is differentiated into longterm and shortterm waveness to simulate visual evaluation by the human eye. Data are divided into longwave (structure size >0.6 mm) and shortwave (structure size <0.6 mm) signals using a mathematical filter function. Longterm waviness represents the variance of the longwave signal amplitude, while the shortterm waviness represents variance of the shortwave signal amplitude. The long- and shortterm waviness of a coating surface can give an indirect measure of topography-influencing factors such as substrate roughness, and flow and leveling properties of coatings. See https://byk-gardnerusa.com/html/Byk/references/Applications/Applicayion_4/application_4.h. For purposes of the present invention, the shortwave values correlate to the surface smoothness of a basecoat in a basecoat/clearcoat system.

A "smooth coating" is one where the cured basecoat/clearcoat system provides shortware values of no more than 14, usually not more than 12, and typically not more than 10 as measured using the Byk Gardner wave scan instrument as described above.

In a further embodiment of the present invention, the polyurethane dispersion, if employed, is present in an amount of at least 1 percent by weight, in some cases at least 2 percent by weight, in other cases at least 3 percent by weight, some instances at least 5 percent by weight, and in other instances at least 10 percent by weight, based on weight of total resin solids present in the thermosetting composition. Also, when present, the polyurethane dispersion is present in the thermosetting composition in an amount of up to 50 percent by weight, in some cases up to 40 percent by weight, in other cases up to 30 percent by weight, in some instances up to 25 percent by weight and in other instances up to 20 percent by weight based on weight of total resin solids present in the thermosetting composition. The level of polyurethane dispersion present in the thermosetting composition of the present invention can range between any combination of these values inclusive of the recited values.

In a further embodiment, the present invention is directed to a method of coating a substrate. The method includes:

(A) applying the thermosetting coating composition described above over at least a portion of the substrate;

(B) coalescing the thermosetting coating composition to form a substantially continuous film on the substrate; and (C) curing the thermosetting coating composition.

The present invention is still further directed to a substrate coated by the above-described method.

An additional embodiment of the present invention is directed to a method of coating a substrate that includes:

(1) applying the above-described thermosetting coating composition over at least a portion of the substrate;

(2) coalescing the thermosetting coating composition to form a substantially continuous film on the substrate; and (3) curing the thermosetting coating composition, where the thermosetting coating composition includes the latex emulsion of seeded polymeric microparticles described above.

The thermosetting coating composition can be applied to the substrate by any conventional coating technique such as brushing, spraying, dipping, or flowing. Spray techniques and equipment for air spraying, airless spray, and electrostatic spraying in either manual or automatic methods known in the art can be used.

During application of the thermosetting coating composition to the substrate, the film thickness of the coating formed on the substrate can range from 0.1 to 5 mils (2.54 to 127 micrometers). In another embodiment, the film thickness of the coating formed on the substrate can range 0.1 to 1 mils (2.54 to 25.4 micrometers), and can be 0.4 to 0.6 mils (10.2 to 15.2 micrometers). The coated substrate can be heated to a temperature and for a time sufficient to effect cure of the thermosetting composition applied thereto.

In another embodiment of the present invention, the thermosetting composition is cured at ambient conditions.

A further additional embodiment of the present invention is directed to a multi-layer composite coating which comprises:

(A) a base coat layer deposited from an effect pigment-containing film-forming base coat composition, where the base coat composition includes the above-described thermosetting composition; and (B) a substantially pigment free top coat layer deposited over at least a portion of said base coat layer from a substantially pigment free top coat composition. In a particular embodiment, the thermosetting composition includes the latex emulsion of seeded polymeric microparticles described above.

Another embodiment of the present invention is directed to a coated substrate that includes:

(A) a substrate, and (B) the multi-layer composite coating composition described above over at least a portion of the substrate. The substrate can comprise a metallic substrate, an elastomeric substrate and combinations thereof.

After forming a basecoat layer on at least a portion of the substrate from the thermosetting coating composition, the basecoat can be cured or alternatively given a drying step in which solvent is driven out of the basecoat film by heating or an air drying period before application of the clearcoat. Suitable drying conditions may depend on the particular thermosetting coating composition, and on the ambient humidity, but a drying time from 1 to 15 minutes at a temperature of 70° to 200° F. (21° to 93° C.) can be adequate.

The substantially pigment-free (or clear) topcoat composition can be applied to the basecoat layer by any conventional coating technique, including, but not limited to, compressed air spraying, electrostatic spraying, and either manual or automatic methods. The clear topcoat can be applied to a cured or to a dried basecoat before the basecoat has been cured. In the latter instance, the two coatings can then be heated to cure both coating layers simultaneously. Typical curing conditions can range from 50° F. to 475° F. (10° C. to 246° F.) for 1 to 30 minutes. The clear topcoat thickness (dry film thickness) can range from 1 to 6 mils (25 to 150 micrometers).

A second substantially pigment free topcoat coating composition can be applied to the first topcoat to form a "clear-on-clear" topcoat. The first topcoat coating composition can be applied over the basecoat as described above. The second topcoat coating composition which may be the same or different from the first topcoat composition can be applied to a cured or to a dried first topcoat before the basecoat and first topcoat have been cured. The basecoat, the first topcoat and the second topcoat can then be heated to cure the three coatings simultaneously.

In one embodiment of the present invention, the base coating composition used to form the base coat layer, contains metallic or reflective pigments is the color coat in a color-plus-clear coating system. These are the so-called "glamour finishes" whereby a differential light reflection effect, dependent upon the viewing angle, is achieved. This "flip-flop" effect can be attributed to the proper orientation (i.e., alignment parallel to the substrate surface) of the metallic and/or other reflective pigment in the base coat. Appearance properties such as gloss and distinctness of image, and smoothness, for the most part, can be attributed to the unpigmented top coat (i.e., the clearcoat). The base coating composition, which contains metallic and/or other reflective pigments, is formulated to maximize the "flip-flop" effect; and the top coating composition, which is substantially pigment-free, is formulated to maximize appearance properties such as gloss.

The above-described pigmented film-forming compositions are storage stable compositions which provide multi-component composite coating compositions suitable for automotive color-plus-clear applications. The reflective pigment-containing base coats exhibit excellent "flip-flop" effect and excellent humidity resistance and appearance properties.

A particular advantage of the thermosetting coating composition of the present invention, is that when used as a basecoat in a multilayer coating system, the basecoat can resist penetration of the topcoat into the cured base coat (referred to as "soak in" or "strike in"). The thermosetting compositions of the present invention provide a coating system with excellent durability and improved overall appearance properties (for example improved flow, smoothness and brightness).

The thermosetting coating composition, when used as a metallic base coat composition, provides excellent metallic flake orientation as measured by Flop Index and include primarily HAPS compliant solvents. Further, the coatings derived from the present basecoat composition can be used with a wide variety of clearcoat chemistries and are able to maintain good metalic appearance by minimizing soak in or strike in.

As mentioned above, the multilayer composite coatings of the present invention can comprise two or more transparent topcoats applied over the base coat layer. It should be understood that when employed, the second transparent topcoat and the first transparent topcoat coating compositions can be the same or different provided that, when applied wet-on-wet, one topcoat does not substantially interfere with the curing of the other for example by inhibiting solvent/water evaporation from a lower layer. Moreover, the first topcoat, the second topcoat or both can be the thermosetting coating composition of the present invention. Alternatively, only one of the first topcoat and the second topcoat is formed from the curable coating composition of the present invention.

In this instance, the topcoat that does not comprise the thermosetting coating composition of the present invention can include any of the crosslinkable coating compositions comprising at least one thermosettable coating material and at least one curing agent. Suitable waterborne clearcoats for this purpose are disclosed in U.S. Pat. No. 5,098,947 (incorporated by reference herein) and are based on water-soluble acrylic resins. Useful solvent borne clearcoats are disclosed in U.S. Pat. Nos. 5,196,485 and 5,814,410 (incorporated by reference herein) and include polyepoxides and polyacid curing agents. Suitable powder clearcoats for this purpose are described in U.S. Pat. No. 5,663,240 (incorporated by reference herein) and include epoxy functional acrylic copolymers and polycarboxylic acid curing agents.

Typically, after forming the first topcoat over the basecoat, the first topcoat is given a drying step in which solvent is driven out of the film by heating or, alternatively, an air drying period or curing step before application of the second topcoat. Suitable drying conditions will depend on the particular first topcoat composition, and on the ambient humidity if the composition is water-borne, but, in general, a drying time from 1 to 15 minutes at a temperature of 75° F. to 200° F. (21° C. to 93° C.) will be adequate.

It should be mentioned that the thermosetting compositions of the present invention can be advantageously formulated as a "monocoat", that is, a coating which forms essentially one coating layer when applied to a substrate. The monocoat coating composition can be pigmented. Non-limiting examples of suitable pigments include those mentioned above. When employed as a monocoat, the coating compositions of the present invention can be applied (by any of the conventional application techniques discussed above) in two or more successive coats, and, in certain instances can be applied with only an ambient flash period between coats. The multi-coats when cured can form essentially one coating layer.

In one embodiment of the present invention, the substrate can comprise a metallic substrate. Examples of suitable metallic substrates can include ferrous metals and non-ferrous metals. Suitable ferrous metals include iron, steel, and alloys thereof. Non-limiting examples of useful steel materials include cold-rolled steel, galvanized (zinc coated) steel, electrogalvanized steel, stainless steel, pickled steel, GALVANNEAL®, GALVALUME®, and GALVAN® zinc-aluminum alloys coated upon steel, and combinations thereof. Useful non-ferrous metals include aluminum, zinc, magnesium and alloys thereof. Combinations or composites of ferrous and non-ferrous metals can also be used.

In another embodiment of the present invention, the substrate can comprise an elastomeric substrate. Suitable elastomeric substrates can include any of the thermoplastic or thermoset synthetic materials well known in the art. Nonlimiting examples of suitable flexible elastomeric substrate materials include polyethylene, polypropylene, thermoplastic polyolefin ("TPO"), reaction injected molded polyurethane ("RIM") and thermoplastic polyurethane ("TPU").

Nonlimiting examples of thermoset materials useful as substrates in connection with the present invention include polyesters, epoxides, phenolics, polyurethanes such as reaction injection molded or "RIM" thermoset materials, and mixtures of any of the foregoing. Nonlimiting examples of suitable thermoplastic materials include thermoplastic polyolefins such as polyethylene, polypropylene, polyamides such as nylon, thermoplastic polyurethanes, thermoplastic polyesters, acrylic polymers, vinyl polymers, polycarbonates, acrylonitrile-butadiene-styrene ("ABS") copolymers, ethylene propylene diene terpolymer ("EPDM") rubber, copolymers, and mixtures of any of the foregoing.

In an additional embodiment of the present invention, the thermosetting composition described above can be present as a resinous phase dispersed in an aqueous phase. In this form, the thermosetting composition can be used in a method of electrocoating a conductive substrate. In this method of electrocoating a conductive substrate serves as an electrode in an electrical circuit comprising an electrode and a counter electrode, the substrate being immersed in the composition thermosetting. The method includes passing electric current between the cathode and the anode to cause deposition of the electrocoating composition on the substrate as a substantially continuous film. The present invention is also directed to a substrate coated using the above-described method.

When the present thermosetting composition is used in an electrocoating operation, the first reactant having reactive functional groups and/or the curing agent may additional include an ionic or salt group. The ionic group may be cationic or anionic. When the ionic group is cationic, it may be, for example, one or more of amine salts, quaternary ammonium and quaternary sulfonium groups. The cationic salt group may be derived from an epoxy group-containing monomer which after polymerization has been post-reacted with an amine salt or an amine and acid.

The present invention will further be described by reference to the following examples. The following examples are merely illustrative of the invention and are not intended to be limiting. Unless otherwise indicated, all percentages are by weight.

EXAMPLES 1–8

The following Examples 1 through 8 describe the preparation of highly crosslinked aqueous dispersions. Examples 2, 3, 4, 7 and 8 are comparative examples having lower levels of crosslinking monomers and/or hydrophilic monomers. The aqueous dispersions were prepared as described below from the following ingredients. Amounts listed below indicate parts by weight (grams) unless otherwise noted.

|  | Ex. 1 | Ex. 2 | Ex. 3 | Ex. 4 | Ex. 5 | Ex. 6 | Ex. 7 |
|---|---|---|---|---|---|---|---|
| Charge 1 | | | | | | | |
| Deionized water | 991.8 | 592.5 | 592.5 | 592.5 | 596.9 | 596.9 | 596.9 |
| Dioctyl sulfousuccinate[1] | 1.5 | 0.9 | 0.9 | 0.9 | 0.9 | 0.9 | 0.9 |
| Feed A | | | | | | | |
| Methyl methacrylate | 15.6 | 9.3 | 9.3 | 9.3 | 9.3 | 9.3 | 9.3 |
| Butyl acrylate | 8.2 | 4.9 | 4.9 | 4.9 | 4.9 | 4.9 | 4.9 |
| Ethylene glycol Dimethacrylate | 12.0 | 7.2 | 7.2 | 7.2 | 7.2 | 7.2 | 7.2 |
| Feed B | | | | | | | |
| Deionized water | 39.2 | 29.5 | 29.5 | 29.5 | 29.5 | 29.5 | 29.5 |
| 4,4'-Azobis (4-cyanopentanoic acid) | 4.0 | 2.4 | 2.4 | 2.4 | 2.4 | 2.4 | 2.4 |
| Dimethylethanol amine | 3.6 | 2.2 | 2.2 | 2.2 | 2.2 | 2.2 | 2.2 |
| Feed C | | | | | | | |
| Methyl methacrylate | 296.4 | 194.7 | 211.4 | 228.1 | 186.2 | 194.6 | 203.0 |
| Butyl acrylate | 279.9 | 183.7 | 200.4 | 217.0 | 175.1 | 183.5 | 191.9 |
| Ethylene glycol Dimethacrylate | 222.4 | 100.0 | 66.6 | 33.3 | 133.8 | 133.8 | 133.8 |
| Acrylamide (50% in water) | 155.6 | 93.0 | 93.0 | 93.0 | 67.1 | 33.6 | |
| Deionized water | 668.6 | 419.0 | 419.0 | 419.0 | 419.0 | 419.0 | 419 |
| Ethoxylated nonyl-phenol ammonium sulfate[2] | 8.1 | 4.8 | 4.8 | 4.8 | 4.8 | 4.8 | 4.8 |
| Feed D | | | | | | | |
| Deionized water | 247.6 | 148.0 | 148.0 | 148.0 | 148.0 | 148.0 | 148.0 |
| 4,4'-Azobis (4-cyanopentanoic acid) | 4.0 | 2.4 | 2.4 | 2.4 | 2.4 | 2.4 | 2.4 |
| Dimethylethanol amine | 3.6 | 2.2 | 2.2 | 2.2 | 2.2 | 2.2 | 2.2 |
| Feed E | | | | | | | |
| Biocide[3] | 3.3 | 2.0 | 2.0 | 2.0 | 2.0 | 2.0 | 2.0 |
| Deionized water | | 1.5 | 1.5 | 1.5 | 1.5 | 1.5 | 1.5 |

-continued

|  | Ex. 1 | Ex. 2 | Ex. 3 | Ex. 4 | Ex. 5 | Ex. 6 | Ex. 7 |
|---|---|---|---|---|---|---|---|
| Physical properties |  |  |  |  |  |  |  |
| Solids[4] (weight %) | 30.0 | 30.0 | 30.0 | 30.0 | 30.0 | 30.0 | 30.0 |
| Particle size[5] (micron) | 0.1 | 0.1 | 0.1 | 0.1 | 0.1 | 0.1 | 0.1 |

[1]Anionic surfactant, available as AOT-75 from Cytec Industries, Inc.
[2]Anionic surfactant, available as Alipal CO-436 from GAF.
[3]Proxel GXL from Avecia Chemicals.
[4]As measured at 110° C. for 1 hour
[5]As measured using a Horiba LA-900 Laser Scattering Particle Size Distribution Analyzer, available from Horiba Instruments, Irvine, California.

Charge#1 was added to a reactor fitted with thermocouple, agitator, and reflux condenser. The contents of the reactor were heated to a temperature of 83° C. at which time Feed A was added over a 1 minute period, followed by a hold period of 2 minutes. Feed B then was added over a 1 minute period and the contents of the flask were held at a temperature of 83° C. for a period of 10 minutes. Feed C then was added over a 120 minute period. Approximately ten minutes after the start of the Feed C addition, Feed D was added over a 120 minute period. Upon the completion of the addition of Feed D, the reaction mixture was held at a temperature of 83° C. for 60 minutes, followed by cooling of the reaction product to an ambient temperature. At ambient temperature Feed E then was added.

COMPARATIVE EXAMPLE 8

U.S. Pat. No. 5,102,925 to Suzuki et al., which is herein incorporated by reference, indicates that 2-ethylhexyl methacrylate and acrylamide are equivalent functional monomers for use in latex emulsion polymerizations. This comparative example replaces acrylamide with 2-ethylhexyl methacrylate. The aqueous dispersion was prepared as in Example 1 above, with the exception that 77.8 g of 2-ethylhexyl methacrylate and 77.8 g of deionized water replaced the 155.6 g of 50% aqueous acrylamide in Feed C.

The addition of Feed C could not be completed due to separation of the reaction solution into two distinct layers within 15 minutes.

This example demonstrates that although the prior art suggests that acrylamide might be used in latex emulsion polymerization systems and that it is an equivalent functional monomer to 2-ethylhexyl methacrylate, the two monomers cannot be used interchangeably and, therefore, are not functional equivalents.

EXAMPLE 9

This example describes the preparation of a polyester polymer used as a component in the aqueous thermosetting compositions of the present invention. The polyester was prepared from the following ingredients as described below.

| INGREDIENTS | PARTS BY WEIGHT (grams) |
|---|---|
| EMPOL 1008[6] | 4206.3 |
| Cyclohexyldimethanol | 1100.5 |
| Dimethanolpropionic acid | 301.5 |
| Trimellitic anhydride | 150.0 |
| Butyl ether of propylene glycol | 2241.7 |

[6]A dimerdiacid available from Cognis.

The polyester polymer was prepared in a four-neck round bottom flask equipped with a thermometer, mechanical stirrer, condenser, dry nitrogen sparge and a heating mantle. The first four ingredients were heated to a temperature of 180° C. and stirred in the flask until 257 grams of distillate was collected and the acid value dropped to the range of 22–25. The material was then cooled to a temperature of 130° C. and the butyl ether of propylene glycol was added. The final product was a liquid having Gardner-Holdt viscosity of Z5–Z6, a non-volatile content of 71.1% (as measured at 110° C. for one hour), and weight averaged molecular weight of 23,125 as measured by gel permeation chromatography using polystyrene standards.

EXAMPLES 10–16

The following Examples 10–16 describe the preparation of aqueous silver metallic basecoat compositions containing the aqueous dispersions of Examples 1–7, respectively. For each of the basecoat compositions of Examples 10–16, an aluminum pigment slurry, "Premix A", first was prepared as described below. The Premix A components were admixed under agitation, and the admixture was allowed to stir for 20 minutes until well dispersed.

| Premix A | |
|---|---|
| COMPONENT | PARTS BY WEIGHT (grams) |
| Propylene Glycol Monobutyl ether | 4.5 |
| Aluminum Paste[7] | 6.5 |
| Tinuvin 1130[8] | 0.3 |
| CYMEL ® 303[9] | 4.5 |
| Aluminum Passivator[10] | 1.9 |
| DIPA[11] | 0.5 |

[7]Pigment paste of a 4:1 w/w ratio of Sparkle Silver 5271-AR and Sparkle Silver E-1745-AR available from Silberline Manufacturing Company.
[8]Substituted benzotriazole UV light absorber available from Ciba Additives.
[9]Fully alkylated HMMM type melamine formaldehyde resin available from Cytec Industries, Inc.
[10]A 60/36/4 w/w solution of LUBRIZOL 2062/diisopropanolamine/Propylene glycol Butyl ether LUBRIZOL 2062 is available from the Lubrizol Co.
[11]Diisopropanolamine.

Aqueous Basecoat Compositions

The aqueous basecoat compositions of Examples 10–16 were prepared as described below from the following ingredients. Amounts listed below are in parts by weight (grams) unless otherwise indicated.

| COMPONENT | Ex 10 | Ex 11 | Ex 12 | Ex 13 | Ex 14 | Ex 15 | Ex 16 |
|---|---|---|---|---|---|---|---|
| DDBSA/DIPA Solution[12] | 0.2 | 0.2 | 0.2 | 0.2 | 0.2 | 0.2 | 0.2 |
| Polyurethane dispersion[13] | 16.1 | 16.1 | 16.1 | 16.1 | 16.1 | 16.1 | 16.1 |
| 50% Aqueous DIPA | 0.4 | 0.4 | 0.4 | 0.4 | 0.4 | 0.4 | 0.4 |
| Dispersion of EXAMPLE 1 | 22.0 |  |  |  |  |  |  |
| Dispersion of EXAMPLE 2 |  | 22.0 |  |  |  |  |  |
| Dispersion of EXAMPLE 3 |  |  | 22.0 |  |  |  |  |
| Dispersion of EXAMPLE 4 |  |  |  | 22.0 |  |  |  |
| Dispersion of EXAMPLE 5 |  |  |  |  | 22.0 |  |  |
| Dispersion of EXAMPLE 6 |  |  |  |  |  | 22.0 |  |

-continued

| | | | | | | | | |
|---|---|---|---|---|---|---|---|---|
| Dispersion of EXAMPLE 7 | | | | | | | | 22.0 |
| Mineral Spirits[14] | 1.8 | 1.8 | 1.8 | 1.8 | 1.8 | 1.8 | 1.8 | |
| Propylene glycol monobutyl ether | 4.5 | 4.5 | 4.5 | 4.5 | 4.5 | 4.5 | 4.5 | |
| Premix A | 18.2 | 18.2 | 18.2 | 18.2 | 18.2 | 18.2 | 18.2 | |
| Deionized Water | 5.6 | 5.6 | 5.6 | 5.6 | 5.6 | 5.6 | 5.6 | |
| Polyester of Example 9 | 6.4 | 6.4 | 6.4 | 6.4 | 6.4 | 6.4 | 6.4 | |
| Deionized Water | 23.8 | 23.8 | 23.8 | 23.8 | 23.8 | 23.8 | 23.8 | |
| 50% Aqueous DIPA | 1.0 | 1.0 | 1.0 | 1.0 | 1.0 | 1.0 | 1.0 | |

[12]Aqueous solution containing 40% w/w dodecylbenzene sulfonic acid, neutralized with diisopropanolamine ("DIPA").
[13]Prepared as follows: A hydrophobic polyurethane prepolymer was first prepared. A latex containing a hydrophobic polyurethane prepolymer was prepared by adding 1,000 g of poly(neopentyl glycol adipate) with a molecular weight (Mw) of 1,000 available as Fomrez 55–112 from Crompton Corporation, Greenwich, CT, 116 g of hydroxyethyl methacrylate, 1.4 g of butylated hydroxytoluene and 1.4 g of dibutyl tin dilaurate to a four necked round bottom flask fitted with a thermocouple, mechanical stirrer, and condenser and heated to 70–76° C. in to obtain a homogeneous solution. Then 244 g of tetramethyl xylene diisocyanate (TMXDI) was added over a one-hour period. Butyl acrylate (90 g) was added and the mixture held at 70° C. for two hours. An additional 250 g butyl acrylate was added and the mixture cooled to ambient temperature. The mixture was 80% solids with a Gardner-Holdt viscosity of X+, a hydroxyl value of 29 and an acid value of 0.8. An aqueous polyurethane dispersion was then prepared as described below from the following ingredients for a pre-emulsion:

| INGREDIENTS | AMOUNT (grams) |
|---|---|
| Distilled Water | 1,760 |
| Rhodapex CO-436[9] | 66.6 |
| Polyglycidyl nonylphenol[10] | 59.8 |
| Dodecylbenzenesulfonic acid (70% in isopropanol) | 28.4 |
| Dimethylethanolamine | 7 |
| Ferrous ammonium sulfate (1% in water) | 4 |
| Defoamer[11] | 0.24 |
| Acrylic acid | 50 |
| Polyurethane prepolymer of Example 9A | 1,500 |
| Ethyleneglycol dimethacrylate | 120 |
| Methyl methacrylate | 210 |
| Butylacrylate | 100 |
| N-methylolacrylamide (48% in water) | 41.6 |

[9]Nonionic surfactant available from RHODIA; 70% in water.
[10]adduct of one mole of nonylphenol and 15 moles of glycidol, 70% aqueous solution.
[11]Foamkill 649 available from Rohm and Haas Company, Philadelphia, PA The pre-emulsion was passed once through a Microfluidizer® M110T (Microfluidics™ division of MFIC Corporation, Newton, Mass.) at 8000 psi and transferred to a four neck round bottom flask equipped with an overhead stirrer, condenser, thermometer, and a nitrogen atmosphere. The polymerization was initiated by adding 3.0 g of isoascorbic acid dissolved in 340 g water followed by a one hour addition of 4.2 g of 35% hydrogen peroxide dissolved in 500 g of water. The temperature of the reaction increased from 24° C. to 59° C. The temperature was reduced to 28° C. and 122.9 g of 50% aqueous diisopropanolamine was added followed by 3.8 g of Proxel GXL in 26.0 g of water. The final pH of the latex was 7.5, the nonvolatile content was 42.9%, the Brookfield viscosity was 92 cps (spindle #1, 50 rpm), and the particle size was 260 nanometers as determined by light scattering using a Coulter N4 Submicron Particle Size Analyzer available from Beckman Coulter, Inc., Miami, Fla.

[14] Mineral Spirits available from Shell Chemical Co.

Each of the aqueous basecoat compositions of Examples 10–16 was prepared by mixing the above-listed ingredients under agitation. The pH of each composition was adjusted to 8.4–8.6 using an appropriate amount of a 50% aqueous solution of DIPA. The viscosity of each of the aqueous basecoat compositions then was reduced to 33 to 37 seconds spray viscosity (DIN #4 cup) using deionized water.

Test Panel Preparation

Each aqueous basecoat was applied in a humidity and temperature controlled spray booth at 60% relative humidity ("RH") and 70° F. (21° C.) onto cold rolled steel substrates which had been previously electrocoated with ED5000 and primed with 1177225A grey primer (both products available commercially from PPG Industries, Inc.), the primed panels having been prepared by ACT Laboratories Inc., of Hillsdale Mich. Each aqueous basecoat composition was spray-applied using the SATA LP90 gun with a MSB nozzle and 135 air cap.

Two sets of test panels was prepared as follows. For one set, the aqueous basecoats were applied such that the dry or cured film thickness of each coating was in the range of 0.4 to 0.6 mils (10.2 to 15.2 micrometers) thickness. The basecoated test panels were allowed an ambient air flash period of 3 minutes at 70° F.(21° C.)/60% RH, followed by heating for 3 minutes at 176° F. (80° C.) to further dehydrate the coating. After dehydration, the basecoated panels were fully cured by heating for 30 minutes at a temperature of 275° F. (135° C.) (hereinafter referred to as "basecoat only" or "BC" panels). A second set of test panels was prepared by applying each of the afore-described basecoating compositions, dehydrating the basecoats as described above, and subsequently spray-applying a clearcoat (TKU1050, a two-component isocyanate containing clearcoat available from PPG Industries, Inc.) over the dehydrated baseocoats. After each clearcoat application, the coated panels were give a 10 minute ambient temperature air flash-period followed by curing at 275° F. (135° C.) for 30 minutes. The clearcoat was applied such that between 1.4 and 1.6 mils (35.6 to 40.6 micrometers) of dry clearcoat film thickness was achieved. (Hereinafter referred to as "basecoat/clearcoat" or "BC/CC".)

Test Panel Evaluation

The test panels prepared as described above were evaluated for "Flop Index" rating using an Xrite MA68-11 flop index instrument available from Xrite Inc, Grandville, Mich. Flop Index is a measure of the change in brightness as a function of viewing angle. The larger the number the greater the color change with angle. A higher Flop Index is more desirable for silver metallic basecoats. Ratings of "Low" and "Very Low" indicate Flop Index values of less than 10 and less than 8, respectively.

TABLE 1

| BASECOAT | Flop Index (BC only) | Flop Index (BC/CC) |
|---|---|---|
| EXAMPLE 10 | 14.9 | 10.8 |
| EXAMPLE 11* | 13.9 | 9.9 |
| EXAMPLE 12* | Low | Very Low |
| EXAMPLE 13* | Low | Very Low |
| EXAMPLE 14 | 15.2 | 10.3 |
| EXAMPLE 15 | 14.8 | 9.3 |
| EXAMPLE 16* | Low | Very Low |

*indicates comparative examples.

The Flop Index data presented in Table 1 above illustrates that aqueous metallic basecoat compositions containing the highly crosslinked aqueous dispersions of the present invention (i.e. the compositions of Examples 10, 14 and 15) provide improved aluminum flake orientation (and thus improved Flop Index results) as compared with analogous compositions containing aqueous dispersions with lower levels of either ethylene glycol dimethacrylate crosslinking monomer and/or acrylamide hydrophilic monomer (i.e., the compositions of Examples 11, 12, 13 and 16).

EXAMPLES 17 AND 18

The following Example 17 and Comparative Example 18 describe the preparation of an aqueous silver metallic basecoat composition in accordance with the present invention and a basecoat composition comprising a conventional microgel, respectively. For each composition, an aluminum pigment slurry, "Premix A" was prepared as described below. The components were admixed under agitation, and the admixture was allowed to stir for 20 minutes until well dispersed.

Premix A

| COMPONENT | Parts by Weight (grams) |
|---|---|
| Propylene Glycol Monobutyl ether | 7.4 |
| Aluminum Paste[15] | 5.1 |
| Tinuvin 1130 | 1.6 |
| CYMEL ® 303 | 3.7 |
| Aluminum Passivator | 1.6 |

[15] Aluminum pigment paste 7670NS available from Toyal America, Inc.

Aqueous Basecoat Compositions

The following examples describe the preparation of two aqueous basecoat compositions. Example 17 describes the prepareation of an aqueous basecoat including the highly crosslinked aqueous dispersion of Example 1 above, and Comparative Example 18 describes the preparation of an aqueous basecoat composition which contains a conventional microgel. The basecoat compositions were prepared as described below from a mixture of the following components.

| COMPONENT | Example 17 | Example 18 (comparative) |
|---|---|---|
| Polyurethane dispersion [16] | 13.1 | 13.1 |
| 50% Aqueous DIPA | 0.7 | 0.7 |
| Dispersion of Example 1 | 18.5 | |
| Microgel [17] | | 25.7 |
| Mineral Spirits | 1.5 | 1.5 |
| Deionized Water | 7.2 | |
| Premix A | 19.4 | 19.4 |
| Polyester of Example 9 | 5.3 | 5.3 |
| Aqueous Thickener Solution[18] | 33.7 | 33.7 |

-continued

| | | |
|---|---|---|
| 50% Aqueous DIPA | 0.6 | 0.6 |
| Flop Index - BC | 15.8 | 14.1 |
| Flop Index - BC/CC | 14.3 | 11.5 |

[16] Aqueous polyurethane dispersion prepeared as described below from the following ingredients:

CHARGE 1

| INGREDIENTS | AMOUNT (grams) |
|---|---|
| Distilled Water | 13320 |
| Igepal CO-897 EP[1] | 171.4 |
| Diisopropanolamine | 360 |
| Polyurethane[2] | 8000 |
| Ethyleneglycol dimethacrylate | 360 |
| Methyl methacrylate | 2280 |
| Butylacrylate | 2000 |

FEED 1

| | |
|---|---|
| Distilled water | 480 |
| t-Butylhydroperoxide | 12.0 |

FEED 2

| | |
|---|---|
| Distilled water | 480 |
| Ferrous ammonium sulfate | 0.24 |
| Sodium metabisulfite | 12.0 |

FEED 3

| | |
|---|---|
| Distilled water | 48.0 |
| Proxel GXL | 24.0 |

[1] Nonionic surfactant available from RHODIA; 70% in water.
[2] The polyurethane was synthesized as follows; 313.3 g of N-methy pyrrolidine, 234.4 g of hydroxyethyl methacrylate, 241.5 g of dimethylol propionic acid, 2.3 g of 2,6-Di-tert-butyl 4-methyl phenol, 2.3 g of triphenyl phosphite, and 2.3 g of dibutyl tin dilaurate were heated to 100° C. in a four necked round bottom flask fitted with a thermocouple, mechanical stirrer, and condenser to obtain a homogeneous solution. Then 1200.0 g of polytetrahydrofuran molecular weight 1000 was added. To this mixture at 90 to 100° C., isophorone diisocyanate 666.9 g was added over 90 minutes. The isocyanate container was rinsed with 153.0 g of butyl acrylate. The reaction mixture was stirred at 90° C. until all the isocyanate groups were reacted. Then 1100.0 g of butyl acrylate was added and cooled to ambient temperature. Charge1 was mixed in a stainless steel beaker until homogeneous and the mixture was microfluidized, as described in U.S. Pat. No. 5,071,904, at 8000 psi into a stainless steel beaker and rinsed with 600 g of water. The microfluidized mixture was transferred to a round bottom flask fitted with a thermometer, mechanical stirrer, and condenser, sparged with nitrogen gas. Feed 1 was added to the flask and stirred for one minute. Then, Feed 2 was added to the flask over 30 minutes, an exothermic reaction was observed. The polymer was cooled to 30° C. and Feed 3 was added.
[17] Prepared according to U.S. Pat. No. 5,071,904, Example 1.
[18] 1% solution of LAPONITE RD in deionized water. LAPONITE RD is a synthetic clay available from Southern Clay Products, Inc.

Each of the basecoat compositions of Examples 17 and 18 was prepared by mixing the respective ingredients under agitation. The pH of each composition was adjusted to 8.4–8.6 using an appropriate amount of 50% aqueous solution of DIPA. The viscosity of each aqueous basecoat composition was reduced to a spray viscosity of 33 to 37 seconds (DIN #4 cup) with deionized water. Test panels were prepared as described above with respect to Examples 10–16. Flop Index results listed above illustrate that the basecoating compositions containing the highly crosslinked aqueous dispersions of the present invention provide improved aluminum flake orientation as compared with an analogous basecoat composition containing a conventional microgel.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention.

We claim:

1. A latex emulsion comprising crosslinked polymeric microparticles dispersed in an aqueous continuous phase in latex emulsion form, the polymeric microparticles prepared from a monomer mix comprised of:
   (a) at least 20 weight percent of a crosslinking monomer having two or more sites of reactive unsaturation and/or monomers having one or more functional groups capable of reacting to form crosslinks after polymerization;
   (b) at least 5 weight percent of a polymerizable ethylenically unsaturated monomer having hydrophilic functional groups having the following structures (I) and/or (II):

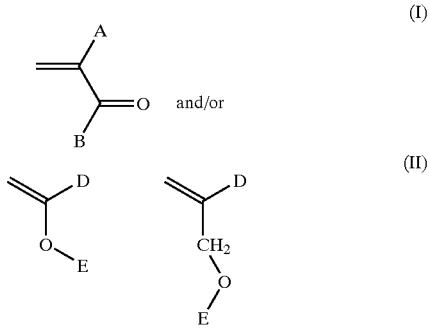

wherein A is selected from H and $C_1$–$C_3$ alkyl; B is selected from —$NR^1R^2$, —$OR^3$ and —$SR^4$, where $R^1$ and $R^2$ are independently selected from H, $C_1$–$C_{18}$ alkyl, $C_1$–$C_{18}$ alkylol and $C_1$–$C_{18}$ alkylamino, $R^3$ and $R^4$ are independently selected from $C_1$–$C_{18}$ alkylol, $C_1$–$C_{18}$ alkylamino, —$CH_2CH_2$—$(OCH_2CH_2)_n$—OH where n is 0 to 30, and, —$CH_2CH_2$—$(OC(CH_3)HCH_2)_m$—OH where m is 0 to 30, D is selected from H and $C_1$–$C_3$ alkyl; and E is selected from —$CH_2CHOHCH_2OH$, $C_1$–$C_{18}$ alkylol, —$CH_2CH_2$—$(OCH_2CH_2)_n$—OH where n is 0 to 30, and —$CH_2CH_2$—$(OC(CH_3)HCH_2)_m$—OH where m is 0 to 30; and
   (c) the balance comprised of one or more polymerizable ethylenically unsaturated monomers, wherein (a), (b) and (c) are different from each other,
wherein the crosslinking monomer having two or more sites of reactive unsaturation in (a) is one or more selected from the group consisting of ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalate, divinyl benzene, methylol (meth)acrylamide, triallylamine, and methylenebis(meth)acrylamide.

2. The latex emulsion of claim 1, wherein the crosslinking monomer (a) has two sites of reactive unsaturation.

3. The latex emulsion of claim 1, wherein the monomers having one or more functional groups capable of reacting to form crosslinks after polymerization are selected from the group consisting of N-alkoxymethyl(meth)acrylamides, γ-(meth)acryloxytrialkoxysilane, N-methylol(meth)acrylamide, (meth)acryliclactones, N-substituted (meth)acrylamide lactones, (meth)acryliclactams, N-substituted (meth)acrylamide lactams and glycidyl(meth)acrylate.

4. The latex emulsion of claim 1 wherein the polymerizable ethylenically unsaturated monomer (c) comprises one or more monomers selected from the group consisting of methyl(meth)acrylate, ethyl(meth)acrylate, propyl(meth)acrylate, N-butyl(meth)acrylate, t-butyl(meth)acrylate, 2-ethylhexyl(meth)acrylate, isobornyl(meth)acrylate, dimethylaminoethyl(meth)acrylate, styrene, (meth)acrylonitrile, lauryl(meth)acrylate, cyclohexyl(meth)acrylate, and 3,3,5-trimethylcyclohexyl(meth)acrylate.

5. The latex emulsion of claim 1, wherein the polymerizable ethylenically unsaturated monomer (b) comprises one or more monomers of structure 1.

6. The latex emulsion of claim 1, wherein the polymerizable ethylenically unsaturated monomer (b) having hydrophilic functional groups comprises one or more monomers selected from the group consisting of (meth)acrylamide, hydroxyethyl(meth)acrylate, hydroxypropyl(meth)acrylate and dimethylaminoethyl(meth)acrylate.

7. The latex emulsion of claim 1, wherein the aqueous continuous phase includes from 0.01 to 5 weight percent of a surface active agent.

8. The latex of claim 1, wherein the crosslinking monomer (a) comprises a monomer selected from glycol di(meth)acrylates and glycol tri(meth)acrylates; the polymerizable ethylenically unsaturated monomer having hydrophilic functional groups (b) comprises (meth)acrylamide; and the polymerizable ethylenically unsaturated monomer (c) comprises one or more alkyl(meth)acrylates.

9. The latex of claim 1, wherein the average particle size of the polymeric microparticles ranges from 0.01 to 1 microns.

10. The latex of claim 1, wherein the latex emulsion is substantially free of polymeric emulsifiers and/or protective colloids.

11. A latex emulsion comprising crosslinked polymeric microparticles dispersed in an aqueous continuous phase, the polymeric microparticles prepared by:
   (I) providing an overall monomer composition comprising constituent parts of:
      (a) a first monomer composition comprising at least 20 weight percent of the overall monomer composition comprised of a crosslinking monomer having two or more sites of reactive unsaturation and/or monomers having one or more functional groups capable of reacting to form crosslinks after polymerization;
      (b) a second monomer composition comprising at least 2 weight percent of the overall monomer composition comprised of a polymerizable ethylenically unsaturated monomer having hydrophilic functional groups having the following structures (I) and/or (II):

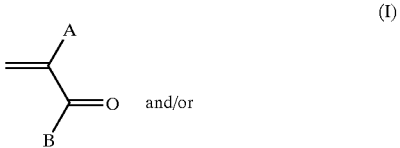

-continued

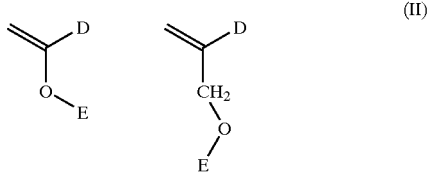
(II)

wherein A is selected from H and $C_1$–$C_3$ alkyl; B is selected from —$NR^1R^2$, —$OR^3$ and —$SR^4$, where $R^1$ and $R^2$ are independently selected from H, $C_1$–$C_{18}$ alkyl, $C_1$–$C_{18}$ alkylol and $C_1$–$C_{18}$ alkylamino, $R^3$ and $R^4$ are independently selected from $C_1$–$C_{18}$ alkylol, $C_1$–$C_{18}$ alkylamino, —$CH_2CH_2$—$(OCH_2CH_2)_n$—OH where n is 0 to 30, and, —$CH_2CH_2$—$(OC(CH_3)HCH_2)_m$—OH where m is 0 to 30, D is selected from H and $C_1$–$C_3$ alkyl; and E is selected from —$CH_2CHOHCH_2OH$, $C_1$–$C_{18}$ alkylol, —$CH_2CH_2$—$(OCH_2CH_2)_n$—OH where n is 0 to 30, and —$CH_2CH_2$—$(OC(CH_3)HCH_2)_m$—OH where m is 0 to 30; and (c) a third monomer composition comprising the balance of the overall monomer composition comprised of one or more polymerizable ethylenically unsaturated monomers, wherein (a), (b) and (c) are different from each other;

(II) polymerizing a portion of the overall monomer mix, said portion comprising from 0.1 to 20 weight percent of (a) and from 0.1 to 20 weight percent of (c) to form polymeric seeds dispersed in the continuous phase; and (III) polymerizing the remainder of monomers (a), (b) and (c) in the presence of the dispersed polymeric seeds in (II) to form a latex emulsion of seeded polymeric microparticles;

wherein the crosslinking monomer in (a) is one or more selected from the group consisting of ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalate, divinyl benzene, methylol(meth)acrylamide, triallylamine, and methylenebis(meth)acrylamide.

12. A thermosetting composition comprising:

(I) a first reactant comprising reactive functional groups;

(II) a curing agent having at least two functional groups reactive with the functional groups of the first reactant in (I); and (III) a latex emulsion comprising crosslinked polymeric microparticles dispersed in an aqueous continuous phase, the polymeric microparticles prepared from a monomer mix comprised of:

(a) at least 20 weight, percent of a crosslinking monomer having two or more groups of reactive unsaturation and/or monomers having one or more functional groups capable of reacting to form crosslinks after polymerization;

(b) at least 2 weight percent of one or more polymerizable ethylenically unsaturated monomers having hydrophilic functional groups having the following structures (I) and/or (II):

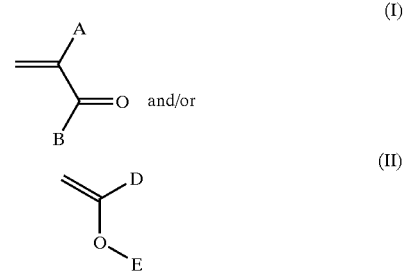

wherein A is selected from H and $C_1$–$C_3$ alkyl; B is selected from —$NR^1R^2$, —$OR^3$ and —$SR^4$, where $R^1$ and $R^2$ are independently selected from H, $C_1$–$C_{18}$ alkyl, $C_1$–$C_{18}$ alkylol and $C_1$–$C_{18}$ alkylamino, $R^3$ and $R^4$ are independently selected from $C_1$–$C_{18}$ alkylol, $C_1$–$C_{18}$ alkylamino, —$CH_2CH_2$—$(OCH_2CH_2)_n$—OH where n is 0 to 30, and, —$CH_2CH_2$—$(OC(CH_3)HCH_2)_m$—OH where m is 0 to 30, D is selected from H and $C_1$–$C_3$ alkyl; and E is selected from —$CH_2CHOHCH_2OH$, $C_1$–$C_{18}$ alkylol, —$CH_2CH_2$—$(OCH_2CH_2)_n$—OH where n is 0 to 30, and —$CH_2CH_2$—$(OC(CH_3)HCH_2)_m$—OH where m is 0 to 30; and (c) the balance comprised of one or more polymerizable ethylenically unsaturated monomers, wherein (a), (b) and (c) are different from each other.

13. The thermosetting composition of claim 11, wherein the crosslinking monomer (a) has two sites of reactive unsaturation.

14. The thermosetting composition claim 11 wherein the crosslinking monomer (a) comprises one or more monomers selected from the group consisting of ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalte, divinyl benzene, methylol(meth)acrylamide, triallylamine, and methylenebis(meth)acrylamide.

15. The thermosetting composition claim 11, wherein the monomers having one or more functional groups capable of reacting to form crosslinks after polymerization the are selected from the group consisting of N-alkoxymethyl(meth)acrylamides, γ-(meth)acryloxytrialkoxysilane, N-methylol(meth)acrylamide, N-butoxymethyl(meth)acrylamide, (meth)acryliclactones, N-substituted (meth)acrylamide lactones, (meth)acryliclactams, N-substituted (meth)acrylamide lactams and glicidyl(meth)acrylate).

16. The thermosetting composition claim 11, wherein the polymerizable ethylenically unsaturated monomer (c) comprises one or more monomers selected from the group consisting of methyl(meth)acrylate, ethyl(meth)acrylate, propyl(meth)acrylate, N-butyl(meth)acrylate, t-butyl(meth) acrylate, 2-ethylhexyl(meth)acrylate, isobornyl(meth) acrylate, styrene, (meth)acrylonitrile, lauryl(meth)acrylate, cyclohexyl(meth)acrylate, and 3,3,5-trimethylcyclohexyl (meth)acrylate.

17. The thermosetting composition of claim 11, wherein the polymerizable ethylenically unsaturated monomer (b) comprises one or more monomers of structure 1.

18. The thermosetting composition claim 11, wherein the ethylenically unsaturated monomer having hydrophilic functional groups (b) comprises one or more monomers selected from the group consisting of (meth)acrylamide, hydroxyethyl(meth)acrylate, hydroxypropyl(meth)acrylate, and dimethylaminoethyl(meth)acrylate.

19. The thermosetting composition of claim 11, wherein the aqueous continuous phase includes from 0.01 to 5 weight percent of a surface active agent.

20. The thermosetting composition of claim 11, wherein the crosslinking monomer (a) comprises at least one of glycol di(meth)acrylates and glycol tri(meth)acrylates; the polymerizable ethylenically unsaturated monomers having hydrophilic functional groups (b) comprises (meth) acrylamide; and the monomer (c) comprises one or more alkyl(meth)acrylates.

21. The thermosetting composition of claim 11, wherein the average particle size of the polymeric microparticles ranges from 0.01 to 1 microns.

22. The thermosetting composition of claim 11, wherein said thermosetting composition is a liquid composition.

23. The thermosetting composition of claim 11, wherein said thermosetting composition is a coating composition.

24. The thermosetting composition of claim 11, wherein the latex emulsion is substantially free of polymeric emulsifiers and/or protective colloids.

25. The thermosetting composition of claim 11, wherein the functional groups of the first reactant (I) are selected from the group consisting of epoxy, carboxylic acid, hydroxy, amide, oxazoline, aceto acetate, isocyanate, methylol, amino, methylol ether, carbamate and mixtures thereof.

26. The thermosetting composition of claim 11, wherein the functional groups of curing agent (II) are selected from the group consisting of epoxy, carboxylic acid, hydroxy, isocyanate, capped isocyanate, amine, methylol, methylol ether, beta-hydroxyalkylamide and mixtures thereof.

27. The thermosetting composition of claim 11, wherein the functional groups of crosslinking agent (II) are different from and reactive with those of the first reactant (I).

28. The thermosetting composition of claim 11, wherein the first reactant (I) is a polymer containing hydroxyl functional groups, and the curing agent (II) comprises one or more materials selected from polyamines, aminoplast resins and polyisocyanates.

29. The thermosetting composition of claim 11, further comprising one or more aqueous polyurethane dispersions.

30. The thermosetting composition of claim 11, further comprising one or more effect pigments.

31. The thermosetting composition of claim 11, wherein the latex emulsion (III) is present in an amount sufficient to provide a Flop Index rating of 10 or greater.

32. A thermosetting composition comprising:
(A) a first reactant comprising reactive functional groups;
(B) a curing agent having at least two functional groups reactive with the functional groups of the first reactant in (A); and
(C) a latex emulsion comprising crosslinked polymeric microparticles dispersed in an aqueous continuous phase, the polymeric microparticles prepared by:

(I) providing an overall monomer composition comprising constituent parts of:
(a) a first monomer composition comprising at least 20 weight percent of the overall monomer composition comprised of a crosslinking monomer having two or more sites of reactive unsaturation and/or monomers having one or more functional groups capable of reacting to form crosslinks after polymerization;
(b) a second monomer composition comprising at least 2 weight percent of the overall monomer composition comprised of a polymerizable ethylenically unsaturated monomer having hydrophilic functional groups having the following structures (I) and/or (II):

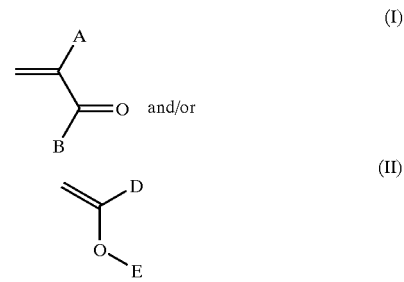

wherein A is selected from H and $C_1$–$C_3$ alkyl; B is selected from —$NR^1R^2$, —$OR^3$ and —$SR^4$, where $R^1$ and $R^2$ are independently selected from H, $C_1$–$C_{18}$ alkyl, $C_1$–$C_{18}$ alkylol and $C_1$–$C_{18}$ alkylamino, $R^3$ and $R^4$ are independently selected from $C_1$–$C_{18}$ alkylol, $C_1$–$C_{18}$ alkylamino, —$CH_2CH_2$—$(OCH_2CH_2)_n$—OH where n is 0 to 30, and, —$CH_2CH_2$—$(OC(CH_3)HCH_2)_m$—OH where m is 0 to 30, D is selected from H and $C_1$–$C_3$ alkyl; and E is selected from —$CH_2CHOHCH_2OH$, $C_1$–$C_{18}$ alkylol, —$CH_2CH_2$—$(OCH_2CH_2)_n$—OH where n is 0 to 30, and —$CH_2CH_2$—$(OC(CH_3)HCH_2)_m$—OH where m is 0 to 30; and
(c) a third monomer composition comprising the balance of the overall monomer composition comprised of one or more polymerizable ethylenically unsaturated monomers, wherein (a), (b) and (c) are different from each other;
(II) polymerizing a portion of the overall monomer mix, said portion comprising from 0.1 to 20 weight percent of (a) and from 0.1 to 20 weight percent of (c) to form polymeric seeds dispersed in the continuous phase; and
(III) polymerizing the remainder of monomers (a), (b) and (c) in the presence of the dispersed polymeric seeds in (II) to form a latex emulsion of seeded polymeric microparticles.

33. A method of coating a substrate comprising:
(A) applying a thermosetting composition over at least a portion of the substrate;
(B) coalescing said thermosetting composition to form a substantially continuous film on the substrate; and
(C) curing the thermosetting composition,
wherein the thermosetting composition comprises:
(I) a first reactant containing one or more reactive functional groups;
(II) a curing agent having at least two functional groups reactive with the functional groups of the first reactant in (I); and (III) a latex emulsion comprising crosslinked polymeric microparticles dispersed in an aqueous continuous phase, the polymeric microparticles prepared from a monomer mix comprised of:
(a) at least 20 weight percent of a crosslinking monomer having two or more sites of reactive unsaturation and/or monomers having one or more functional groups capable of reacting to form crosslinks after polymerization;
(b) at least 2 weight percent of one or more polymerizable ethylenically unsaturated monomers having hydrophilic functional groups; and
(c) the balance comprised of one or more polymerizable ethylenically unsaturated monomers, wherein (a), (b) and (c) are different from each other.

34. The method of claim 32, wherein the crosslinking monomer (a) has two or more sites of reactive unsaturation.

35. The method of claim 32 wherein the crosslinking monomer (a) comprises one or more monomers selected from the group consisting of ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalte, divinyl benzene, methylol (meth)acrylamide, triallylamine, and methylenebis(meth)acrylamide.

36. The method of claim 32, wherein the monomers having one or more functional groups capable of reacting to form crosslinks after polymerization the are selected from the group consisting of N-alkoxymethyl(meth)acrylamides, γ-(meth)acryloxytrialkoxysilane, N-methylol(meth)acrylamide, N-butoxymethyl(meth)acrylamide, (meth)acryliclactones, N-substituted (meth)acrylamide lactones, (meth)acryliclactams, N-substituted (meth)acrylamide lactams and glicidyl(meth)acrylate.

37. The method of claim 32, wherein the polymerizable ethylenically unsaturated monomer(c) comprises one or more monomers selected from the group consisting of methyl(meth)acrylate, ethyl(meth)acrylate, propyl(meth)acrylate, N-butyl(meth)acrylate, t-butyl(meth)acrylate, 2-ethylhexyl(meth)acrylate, isobornyl(meth)acrylate, N-butoxy methyl(meth)acrylamide, styrene, (meth)acrylonitrile, lauryl(meth)acrylate, cyclohexyl(meth)acrylate, and 3,3,5-trimethylcyclohexyl(meth)acrylate.

38. The method of claim 32, wherein the polymerizable ethylenically unsaturated monomer (b) comprises one or more monomers of structure 1.

39. The method of claim 32, wherein the polymerizable ethylenically unsaturated monomer having hydrophilic functional groups (b) comprises one or more monomers selected from the group consisting of (meth)acrylamide, hydroxyethyl(meth)acrylate, hydroxypropyl(meth)acrylate and dimethylaminoethyl(meth)acrylate.

40. The method of claim 32, wherein the aqueous continuous phase includes from 0.01 to 5 weight percent of a surface active agent.

41. The method of claim 32, wherein the crosslinking monomer (a) is selected from glycol di(meth)acrylates and glycol tri(meth)acrylates; the polymerizable ethylenically unsaturated monomers having hydrophilic functional groups (b) comprises (meth)acrylamide; and the polymerizable ethylenically unsaturated monomer (c) comprises one or more alkyl(meth)acrylates.

42. The method of claim 32, wherein the average particle size of the polymeric microparticles ranges from 0.01 to 1 micron.

43. The method of claim 32, wherein the thermosetting composition is a liquid composition.

44. The method of claim 32, wherein the functional groups of the first reactant (I) are selected from the group consisting of epoxy, carboxylic acid, hydroxy, amide, oxazoline, aceto acetate, isocyanate, methylol, amino, methylol ether, carbamate and mixtures thereof.

45. The method of claim 32, wherein the functional groups of curing agent (II) are selected from the group consisting of epoxy, carboxylic acid, hydroxy, isocyanate, capped isocyanate, amine, methylol, methylol ether, beta-hydroxyalkylamide and mixtures thereof.

46. The method of claim 32, wherein the functional groups of curing agent (II) are different from and reactive with those of the first reactant (I).

47. The method of claim 32, wherein the first reactant (I) comprises a polymer containing hydroxyl functional groups, and the curing agent (II) comprises one or more materials selected from aminoplast resins and polyisocyanates.

48. A substrate coated by the method of claim 32.

49. A method of coating a substrate comprising:
(A) applying a thermosetting composition over at least a portion of the substrate;
(B) coalescing said thermosetting composition to form a substantially continuous film on the substrate; and
(C) curing the thermosetting composition, wherein the thermosetting composition comprises:
(I) a first reactant comprising reactive functional groups;
(II) a curing agent having at least two functional groups reactive with the functional groups of the first reactant in (I); and
(III) a latex emulsion comprising crosslinked polymeric microparticles dispersed in an aqueous continuous phase, the polymeric microparticles prepared by:
(i) providing an overall monomer composition comprising constituent parts of:
(a) a first monomer composition comprising at least 20 weight percent of the overall monomer composition comprised of a crosslinking monomer having two or more sites of reactive unsaturation and/or monomers having one or more functional groups capable of reacting to form crosslinks after polymerization;
(b) a second monomer composition comprising at least 5 weight percent of the overall monomer composition comprised of a polymerizable ethylenically unsaturated monomer having hydrophilic functional groups having the following structures (I) and/or (II):

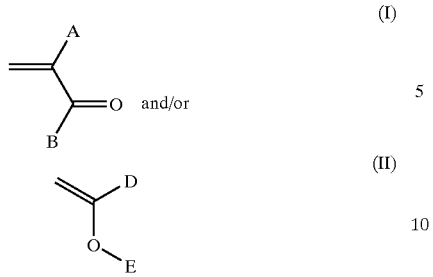

(I)

and/or (II)

wherein A is selected from H and $C_1$–$C_3$ alkyl; B is selected from —$NR^1R^2$, —$OR^3$ and —$SR^4$, where $R^1$ and $R^2$ are independently selected from H, $C_1$–$C_{18}$ alkyl, $C_1$–$C_{18}$ alkylol and $C_1$–$C_{18}$ alkylamino, $R^3$ and $R^4$ are independently selected from $C_1$–$C_{18}$ alkylol, $C_1$–$C_{18}$ alkylamino, —$CH_2CH_2$—$(OCH_2CH_2)_n$—OH where n is 0 to 30, and, —$CH_2CH_2$—$(OC(CH_3)HCH_2)_m$—OH where m is 0 to 30, D is selected from H and $C_1$–$C_3$ alkyl; and E is selected from —$CH_2CHOHCH_2OH$, $C_1$–$C_{18}$ alkylol, —$CH_2CH_2$—$(OCH_2CH_2)_n$—OH where n is 0 to 30, and —$CH_2CH_2$—$(OC(CH_3)HCH_2)_m$—OH where m is 0 to 30; and (c) a third monomer composition comprising the balance of the overall monomer composition comprised of one or more polymerizable ethylenically unsaturated monomers, wherein (a), (b) and (c) are different from each other;

(ii) polymerizing a portion of the overall monomer mix, said portion comprising from 0.1 to 20 weight percent of (a) and from 0.1 to 20 weight percent of (c) to form polymeric seeds dispersed in the continuous phase; and (iii) polymerizing the remainder of monomers (a), (b) and (c) in the presence of the dispersed polymeric seeds in (II) to form a latex emulsion of seeded polymeric microparticles.

50. A multi-layer composite coating comprising:

(A) a base coat layer deposited from an effect pigment-containing film-forming base coat composition, wherein said base coat composition comprises:

(I) a first reactant containing one or more functional groups;

(II) a curing agent having at least two functional groups reactive with the functional groups of the first reactant in (I); and (III) a latex emulsion comprising crosslinked polymeric microparticles dispersed in an aqueous continuous phase, the polymeric microparticles prepared from a monomer mix comprised of:

(a) at least 20 weight percent of a crosslinking monomer having two or more sites of reactive unsaturation and/or monomers having one or more functional groups capable of reacting to form crosslinks after polymerization;

(b) at least 5 weight percent of one or more polymerizable ethylenically unsaturated monomers having hydrophilic functional groups having the following structures (I) and/or (II)

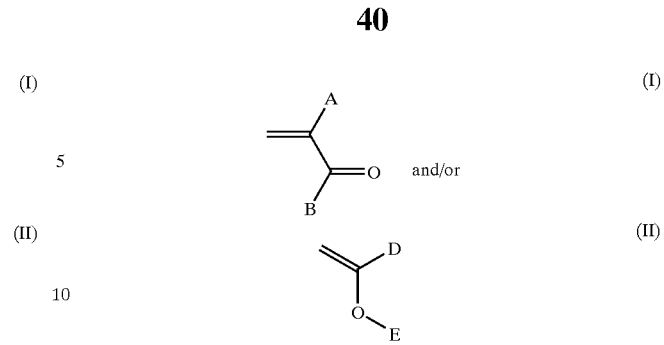

(I)

and/or (II)

wherein A is selected from H and $C_1$–$C_3$ alkyl; B is selected from —$NR^1R^2$, —$OR^3$ and —$SR^4$, where $R^1$ and $R^2$ are independently selected from H, $C_1$–$C_{18}$ alkyl, $C_1$–$C_{18}$ alkylol and $C_1$–$C_{18}$ alkylamino, $R^3$ and $R^4$ are independently selected from $C_1$–$C_{18}$ alkylol, $C_1$–$C_{18}$ alkylamino, —$CH_2CH_2$—$(OCH_2CH_2)_n$—OH where n is 0 to 30, and, —$CH_2CH_2$—$(OC(CH_3)HCH_2)_m$—OH where m is 0 to 30, D is selected from H and $C_1$–$C_3$ alkyl; and E is selected from —$CH_2CHOHCH_2OH$, $C_1$–$C_{18}$ alkylol, —$CH_2CH_2$—$(OCH_2CH_2)_n$—OH where n is 0 to 30, and —$CH_2CH_2$—$(OC(CH_3)HCH_2)_m$—OH where m is 0 to 30; and (c) the balance comprised of one or more non-hydrophilic polymerizable ethylenically unsaturated monomers, wherein (a), (b) and (c) are different from each other; and (B) a substantially pigment free top coat layer deposited over at least a portion of said base coat layer from a substantially pigment free top coat composition.

51. The multi-layer composite coating of claim 49, wherein the crosslinking monomer (a) has two or more sites of reactive unsaturation.

52. The multi-layer composite coating of claim 49 wherein the crosslinking monomer (a) comprises one or more monomers selected from the group consisting of ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalte, divinyl benzene, methylol (meth)acrylamide, triallylamine, and methylenebis(meth)acrylamide.

53. The multi-layer composite coating of claim 49, wherein the monomers having one or more functional groups capable of reacting to form crosslinks after polymerization the are selected from the group consisting of N-alkoxymethyl(meth)acrylamides, γ-(meth)acryloxytrialkoxysilane, N-methylol(meth)acrylamide, N-butoxymethyl(meth)acrylamide, (meth)acryliclactones, N-substituted (meth)acrylamide lactones, (meth)acryliclactams, N-substituted (meth)acrylamide lactams and glicidyl(meth)acrylate.

54. The multi-layer composite coating of claim 49 wherein the polymerizable ethylenically unsaturated monomer (c) comprises one or more monomers selected from the group consisting of methyl(meth)acrylate, ethyl(meth) acrylate, propyl(meth)acrylate, N-butyl(meth)acrylate, t-butyl(meth)acrylate, 2-ethylhexyl(meth)acrylate, isobornyl(meth)acrylate, styrene, (meth)acrylonitrile, lauryl (meth)acrylate, cyclohexyl(meth)acrylate, and 3,3,5-trimethylcyclohexyl(meth)acrylate.

55. The multi-layer composite coating of claim 49, wherein the polymerizable ethylenically unsaturated monomer (b) comprises one or monomers of structure 1.

56. The multi-layer composite coating of claim 49, wherein the polymerizable ethylenically unsaturated monomer having hydrophilic functional groups (b) comprises one or more monomers selected from the group consisting of (meth)acrylamide, hydroxyethyl(meth)acrylate, hydroxypropyl(meth)acrylate, and dimethylaminoethyl (meth)acrylate.

57. The multi-layer composite coating of claim 49, wherein the aqueous continuous phase includes from 0.01 to 5 weight percent of a surface active agent.

58. The multi-layer composite coating of claim 49, wherein the crosslinking monomer (a) comprises at least one of glycol di(meth)acrylates and glycol tri(meth)acrylates; the polymerizable ethylenically unsaturated monomer having hydrophilic functional groups (b) comprises at least one (meth)acrylamide and the monomer (c) comprises at least one alkyl(meth)acrylate.

59. The multi-layer composite coating of claim 49, wherein the average particle size of the polymeric microparticles ranges from 0.01 to 1 micron.

60. The multi-layer composite coating of claim 49, wherein said base coat composition is a liquid composition.

61. The multi-layer composite coating of claim 49, wherein the functional groups of the first reactant (I) are selected from the group consisting of epoxy, carboxylic acid, hydroxy, amide, oxazoline, aceto acetate, isocyanate, methylol, amino, methylol ether, carbamate and mixtures thereof.

62. The multi-layer composite coating of claim 49, wherein the functional groups of curing agent (II) are selected from the group consisting of epoxy, carboxylic acid, hydroxy, isocyanate, capped isocyanate, amine, methylol, methylol ether, beta-hydroxyalkylamide and mixtures thereof.

63. The multi-layer composite coating of claim 49, wherein the functional groups of curing agent (II) are different from and reactive with those of the first reactant (I).

64. The multi-layer composite coating of claim 49, wherein the first reactant (I) comprises a polymer containing hydroxyl functional groups, and the functional groups of the curing agent (II) comprises one or more selected from the group consisting of aminoplast resins and polyisocyanates.

65. The multi-layer composite coating of claim 49, wherein the latex emulsion (III) is present in the basecoat composition in an amount sufficient to provide a Flop Index rating for the multi-layer composite coating of 10 or greater.

66. The multi-layer composite coating of claim 49, wherein the basecoat composition further comprises an aqueous polyurethane dispersion.

67. A multi-layer composite coating comprising:
(A) a base coat layer deposited from a pigmented film-forming base coat composition, wherein said base coat composition comprises:
(I) a first reactant containing one or more functional groups;
(II) a curing agent having at least two functional groups reactive with the functional groups of the first reactant in (I); and
(III) a latex emulsion comprising crosslinked polymeric microparticles dispersed in an aqueous continuous phase, the polymeric microparticles prepared by:
(1) providing an overall monomer composition comprising constituent parts of:
(a) a first monomer composition comprising at least 20 weight percent of the overall monomer composition comprised of a crosslinking monomer having two or more sites of reactive unsaturation and/or monomers having one or more functional groups capable of reacting to form crosslinks after polymerization;
(b) a second monomer composition comprising at least 2 weight percent of the overall monomer composition comprised of a polymerizable ethylenically unsaturated monomer having hydrophilic functional groups having the following structures (I) and/or (II):

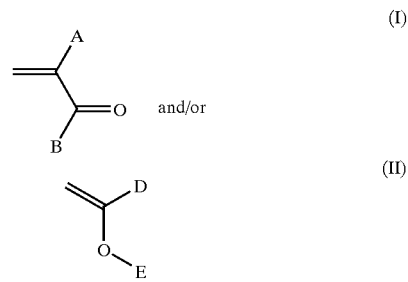

wherein A is selected from H and $C_1$–$C_3$ alkyl; B is selected from —$NR^1R^2$, —$OR^3$ and —$SR^4$, where $R^1$ and $R^2$ are independently selected from H, $C_1$–$C_{18}$ alkyl, $C_1$–$C_{18}$ alkylol and $C_1$–$C_{18}$ alkylamino, $R^3$ and $R^4$ are independently selected from $C_1$–$C_{18}$ alkylol, $C_1$–$C_{18}$ alkylamino, —$CH_2CH_2$—$(OCH_2CH_2)_n$—OH where n is 0 to 30, and, —$CH_2CH_2$—$(OC(CH_3)HCH_2)_m$—OH where m is 0 to 30, D is selected from H and $C_1$–$C_3$ alkyl; and E is selected from —$CH_2CHOHCH_2OH$, $C_1$–$C_{18}$ alkylol, —$CH_2CH_2$—$(OCH_2CH_2)_n$—OH where n is 0 to 30, and —$CH_2CH_2$—$(OC(CH_3)HCH_2)_m$—OH where m is 0 to 30; and
(c) a third monomer composition comprising the balance of the overall monomer composition comprised of one or more polymerizable ethylenically unsaturated monomers, wherein (a), (b) and (c) are different from each other;
(2) polymerizing a portion of the overall monomer mix, said portion comprising from 0.1 to 20 weight percent of (a) and from 0.1 to 20 weight percent of (c) to form polymeric seeds dispersed in the continuous phase; and
(3) polymerizing the remainder of monomers (a), (b) and (c) in the presence of the dispersed polymeric seeds in (II) to form a latex emulsion of seeded polymeric microparticles; and
(B) a substantially pigment free top coat deposited over at least a portion of said base coat layer from a top coat composition.

68. A coated substrate comprising:

(A) a substrate, and (B) the multi-layer composite coating composition of claim 46 over at least a portion of the substrate.

69. The coated substrate of claim 67, wherein the substrate is selected from a metallic substrate, an elastomeric substrate, and combinations thereof.

70. A coated substrate comprising:
(A) a substrate, and
(B) the multi-layer composite coating composition of claim 61 over at least a portion of the substrate.

71. The coated substrate of claim 69, wherein the substrate is selected from a metallic substrate, an elastomeric substrate, and combinations thereof.

* * * * *